(12) United States Patent
Nakamura

(10) Patent No.: US 8,170,694 B2
(45) Date of Patent: May 1, 2012

(54) NETWORK UNIT AND PROGRAMMABLE CONTROLLER USING THE SAME

(75) Inventor: Masato Nakamura, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 877 days.

(21) Appl. No.: 12/093,569

(22) PCT Filed: May 31, 2006

(86) PCT No.: PCT/JP2006/310898
§ 371 (c)(1),
(2), (4) Date: May 13, 2008

(87) PCT Pub. No.: WO2007/055046
PCT Pub. Date: May 18, 2007

(65) Prior Publication Data
US 2009/0049215 A1     Feb. 19, 2009

(30) Foreign Application Priority Data
Nov. 14, 2005   (JP) .................................. 2005-329308

(51) Int. Cl.
*G05B 11/01* (2006.01)
(52) U.S. Cl. .......................................... 700/20; 710/106
(58) Field of Classification Search ............ 700/20
See application file for complete search history.

(56) References Cited

U.S. PATENT DOCUMENTS

| | | | | |
|---|---|---|---|---|
| 4,570,217 A | * | 2/1986 | Allen et al. ..................... 700/83 |
| 4,831,582 A | * | 5/1989 | Miller et al. ........................... 1/1 |
| 4,852,047 A | * | 7/1989 | Lavallee et al. ................. 700/86 |
| 4,967,409 A | * | 10/1990 | Narumiya et al. ............ 370/455 |
| 4,972,314 A | * | 11/1990 | Getzinger et al. ............ 711/149 |
| 5,414,813 A | * | 5/1995 | Shiobara ....................... 709/245 |
| 5,752,033 A | * | 5/1998 | Suda et al. ..................... 717/109 |
| 5,949,754 A |   | 9/1999 | Takahashi |
| 6,205,145 B1 |   | 3/2001 | Yamazaki |
| 6,321,272 B1 | * | 11/2001 | Swales ......................... 709/250 |
| 6,330,482 B1 | * | 12/2001 | McCain et al. .................... 700/9 |
| 6,640,145 B2 | * | 10/2003 | Hoffberg et al. ............... 700/83 |
| 6,724,926 B2 | * | 4/2004 | Jones et al. ................... 382/135 |
| 6,996,263 B2 | * | 2/2006 | Jones et al. ................... 382/135 |
| 7,272,815 B1 | * | 9/2007 | Eldridge et al. ............. 717/101 |

(Continued)

FOREIGN PATENT DOCUMENTS
DE   19750662 A1   5/1999
(Continued)

OTHER PUBLICATIONS

Taiwanese Office Action, dated Feb. 22, 2010.

(Continued)

*Primary Examiner* — Ramesh Patel
*Assistant Examiner* — Anthony Whittington
(74) *Attorney, Agent, or Firm* — Sughrue Mion, PLLC

(57) ABSTRACT

A network unit in a programmable controller of a building block mutually connects an information system network and a control system network. The network unit includes transfer analyzing units that judge to which of interface units received data received from the information system network and the control system network should be allocated. Moreover, received data that needs to be transferred is converted into predetermined data by conversion processing units included in the networks and output to the information system network or the control system network without being transmitted to a system bus.

8 Claims, 9 Drawing Sheets

U.S. PATENT DOCUMENTS

| | | | |
|---|---|---|---|
| 7,664,869 B2 * | 2/2010 | Baker et al. | 709/230 |
| 7,853,336 B2 * | 12/2010 | Grgic et al. | 700/11 |
| 2001/0002449 A1 | 5/2001 | Eisenmann et al. | |
| 2001/0046212 A1 | 11/2001 | Nakajima | |
| 2002/0067740 A1 | 6/2002 | Vestal et al. | |
| 2002/0154807 A1 * | 10/2002 | Jones et al. | 382/135 |
| 2003/0004686 A1 * | 1/2003 | Ueno et al. | 702/188 |
| 2003/0081824 A1 * | 5/2003 | Mennie et al. | 382/135 |
| 2003/0225813 A1 * | 12/2003 | Nagano et al. | 709/102 |
| 2005/0097233 A1 * | 5/2005 | Oka et al. | 710/9 |
| 2005/0102556 A1 * | 5/2005 | Yamada et al. | 714/11 |
| 2007/0016476 A1 * | 1/2007 | Hoffberg et al. | 705/14 |
| 2008/0104189 A1 * | 5/2008 | Baker et al. | 709/206 |
| 2008/0222325 A1 * | 9/2008 | Ishino et al. | 710/60 |

FOREIGN PATENT DOCUMENTS

| | | |
|---|---|---|
| DE | 69805952 T2 | 1/2003 |
| EP | 0856969 A1 | 8/1998 |
| JP | 2-113744 A | 4/1990 |
| JP | 08-212112 A | 8/1996 |
| JP | 2611388 B2 | 5/1997 |
| JP | 11-65623 A | 3/1999 |
| JP | 11-231924 | 8/1999 |
| JP | 2000-284808 | 10/2000 |
| JP | 2001-339431 A | 12/2001 |
| JP | 2002-258907 A | 9/2002 |
| JP | 2003-186507 | 7/2003 |
| JP | 2004-110613 | 4/2004 |
| JP | 2004-151807 | 5/2004 |
| TW | 330362 | 4/1998 |
| TW | 394875 | 6/2000 |
| TW | 508926 B | 11/2002 |
| TW | 525049 B | 3/2003 |
| TW | 531998 B | 5/2003 |
| WO | 2005006091 A1 | 1/2005 |

OTHER PUBLICATIONS

Korean Official Notice of Allowance dated Mar. 30, 2010.
Decision of a Patent Grant from the Japanese Patent Office in a counterpart Application No. 2007-021583.

* cited by examiner

NETWORK UNIT AND PROGRAMMABLE CONTROLLER USING THE SAME

TECHNICAL FIELD

The present invention relates to a network unit that is used as a block unit in a programmable controller of a building block type and allocates a desired function to the programmable controller and a programmable controller using the network unit.

BACKGROUND ART

In factory automation systems, a plurality of programmable controllers are prepared to control operations of each of various manufacturing facilities arranged on a manufacturing line. Various input devices (sensors, switches, etc.) and output devices (electromagnetic valves, motors, indicating lamps, etc.) set in the manufacturing facilities are connected to each of the programmable controllers. Each of the programmable controllers control operations of the output devices corresponding thereto based on input signals from the input devices connected thereto and conditions programmed in advance. All the programmable controllers are connected to a control system network and a programmable controllers set as a master station can transmits data to other programmable controllers. Thus, the conditions are usually received by a programmable controller from a programmable controller set as a master station. The respective programmable controllers collect, when necessary, information concerning operation states and the like of the manufacturing facilities, which are controlled by the other programmable controllers, through the control system network and use the collected information for the operation control of the output devices.

In many cases, a function of a gateway is allocated to at least one of the programmable controllers belonging to one control system network. The programmable controller with the gateway function (hereinafter abbreviated as "gateway PC" in some case) is connected to a monitoring apparatus through an information system network. The monitoring apparatus performs, via the gateway PC, monitoring of operation states of manufacturing facilities subjected to operation control by the gateway PC and each of manufacturing facilities subjected to operation control by the other programmable controllers, collection of information concerning a production state in a manufacturing line, logging of the respective programmable controllers (including the gateway PC), supply of control data to the respective programmable controllers (including the gateway PC), and the like. The control data sent from the monitoring apparatus to the programmable controllers (including the gateway PC) relates to relatively easy operation control, i.e., a high real time property is not required of the operation control.

It is possible to construct the control system network and the information system network as one network by employing, for example, ATM (Asynchronous Transfer Mode) technology. However, a network system that can be constructed at low cost and easily is preferable as a network system in factory automation. Therefore, in general, the information system network is constructed by using the Ethernet (registered trademark) and configured separately from the control system network in which a data update period needs to be guaranteed.

Nowadays, factory automation systems are introduced in various industries. Functions required of programmable controllers are diversified. Therefore, to flexibly cope with all these needs, a programmable controller of a building block type is being developed. In a programmable controller of this type, various block units such as a power supply unit, a central processing unit (CPU) unit, an I/O (Input/Output) analog unit, and an I/O digital unit are prepared so that desired functions can be allocated to the programmable controller by preparing predetermined block units depending on the need. In a gateway PC of the building block type, usually, in addition to the power supply unit, the CPU unit, and the respective I/O units, a control-system network unit connected to the control system network and an information-system network unit connected to the information system network are prepared.

For example, when transmitting control data from a management apparatus to the programmable controller, which is connected to the control system network, through the information network, first, control data is transmitted from the management apparatus to the gateway PC through the information system network. The control data transmitted to the gateway PC is received by the information-system network unit and, then, transmitted to the CPU unit through a system bus.

The CPU unit of the gateway PC judges, based on predetermined information prepared in advance, whether the received data is addressed to the CPU unit itself or to another predetermined programmable controller. When the received data is addressed to the CPU unit itself, the CPU unit executes processing for capturing the received data as control data for the CPU unit itself. When the received data is addressed to another predetermined programmable controller, the CPU unit outputs the received data to the control-system network unit through the system bus. The received data transmitted to the control-system network unit is transmitted to the control system network after performing a protocol conversion to allow the programmable controller belonging to the control system network to receive the data and is received by the predetermined programmable controller.

On the other hand, when transmitting data from a predetermined programmable controller connected to only the control system network to the monitoring apparatus, first, the data is transmitted to the gateway PC through the control system network. The data transmitted to the gateway PC is received by the control-system network unit and, then, transmitted to the CPU unit through the system bus. The CPU unit of the gateway PC judges a transmission destination of the received data based on the predetermined information prepared in advance, recognizes that the received data is addressed to the monitoring apparatus, and outputs the received data to the information-system network unit through the system bus. The received data transmitted to the information-system network unit is transmitted to the information system network after performing a protocol conversion to allow the monitoring apparatus to receive the data and is received by the monitoring apparatus.

The gateway PC controls operations of the manufacturing facilities corresponding thereto as well. Therefore, besides signals or data received by the information-system network unit and the control-system network unit, signals input to the I/O unit from the respective input devices corresponding thereto are also transmitted to the CPU unit of the gateway PC. When the signals inputs to the I/O unit are transmitted to the CPU unit, the CPU unit judges how the output devices corresponding thereto should be controlled and outputs a predetermined control signal to the I/O unit.

For example, assume that the gateway PC is to sequence-control operations of the manufacturing facilities corresponding to the gateway PC. In this case, the gateway PC needs to periodically output the predetermined control signal to the respective output devices at a short period based on signals periodically input to the I/O unit from the respective input devices at a short period and the conditions programmed in advance. In other words, the gateway PC needs to timely perform processing of the input signals from the respective input devices and output of control signals to the respective output devices on a real time basis.

While timely performing the processing of the input signals from the respective input devices and the output of the control signals to the respective output devices on a real time basis, to surely process transmission and reception to and from the management apparatus or the other programmable controllers, for example, in a programmable controller according to the invention described in Patent Document 1, when there is a data link request (including a message and a command) from an external apparatus and a data link request to the external apparatus during execution of a scan cycle for repeatedly performing the processing of the input signals from the respective input devices, the output of the control signals to the respective output devices, and the like, these data link requests are sequentially set in a reception queue or a transmission queue. The data link requests set in the reception queue or the transmission queue are processed after the execution of the scan cycle.

Patent Document 1: Japanese Patent Application Laid-open No. H11-65623

DISCLOSURE OF INVENTION

Problem to be Solved by the Invention

However, the control system network and the information system network are being increased in size. As these networks are increased in size, loads exerted on the CPU unit and the system bus of the gateway PC increase. When the loads are high, even if the data link requests are processed after the execution of the scan cycle as in the programmable controller in the invention described in Patent Document 1, it is difficult to timely perform the processing of the input signals from the respective input devices and the output of the control signals to the respective output devices on a real time basis. In other words, it is difficult to apply predetermined sequence control to the manufacturing facilities corresponding to the gateway PC. As a result, it has become difficult to further increase the sizes of the control system network and the information system network and it has also difficult to increase a size of the factory automation system.

The present invention has been devised in view of the above and it is an object of the present invention to obtain a network unit that can easily control loads exerted to a CPU unit and a system bus of a gateway PC even when a control system network and an information system network are increased in size and a programmable controller including the network unit.

Means for Solving Problem

To achieve the above object, a network unit that is used as a block unit in a programmable controller of a building block type, which monitors manufacturing facilities arranged on a manufacturing line and controls operations of the manufacturing facilities, and mutually connects an information system network for connecting at least one node including a monitoring apparatus and the programmable controller and a control system network for connecting the programmable controller and other programmable controllers, includes an information-system interface unit connected to the information system network; a control-system interface unit connected to the control system network; a bus interface unit connected to a system bus of the programmable controller; an information storing unit configured to store therein allocation information as a reference in allocating received data received by the information-system interface unit or the control-system interface unit to any one of the information-system interface unit, the control-system interface unit, and the bus interface unit according to transmission destination information included in the received data; an information-system allocation unit that allocates, based on transmission destination information included in received data received by the information-system interface unit and the allocation information stored in the information storing unit, the received data received by the information-system interface unit to one of the control-system interface unit and the bus interface unit; a control-system allocation unit that allocates, based on transmission destination information included in received data received by the control-system interface unit and the allocation information stored in the information storing unit, the received data received by the control-system interface unit to one of the information-system interface unit and the bus interface unit; a control-system-conversion processing unit that converts the received data allocated to the control-system interface unit side by the information-system allocation unit into data corresponding to a protocol in the control system network and outputs the data to the control-system interface unit; an information-system-conversion processing unit that converts the received data allocated to the information-system interface unit side by the control-system allocation unit into data corresponding to a protocol in the information system network and outputs the data to the information-system interface unit; and a transmission arbitrating unit that arbitrates the respective received data allocated to the bus interface unit side by the information-system allocation unit and the control-system allocation unit, respectively, not to overlap each other.

To achieve the above object, a programmable controller of a building block type includes a system bus; a central processing unit connected to the system bus, an I/O unit connected to the system bus and connected to an input and output device of a manufacturing facility; and a network unit connected to an information system network and a control system network, the programmable controller monitoring manufacturing facilities arranged on a manufacturing line to control operations of the manufacturing facilities and mutually connecting the information system network and the control system network, wherein the network unit is the above-mentioned network unit according to the present invention.

EFFECT OF THE INVENTION

In the network unit according to the present invention, the network unit alone can mutually connect the information system network and the control system network. Therefore, even when the information system network and the control system network are increased in size, it is easy to control loads exerted on the CPU unit and the system bus of the gateway PC. The same holds true for the programmable controller according to the present invention including the network unit. Therefore, with these inventions, it is easy to realize an increase in size of a factory automation system.

Figure 1:
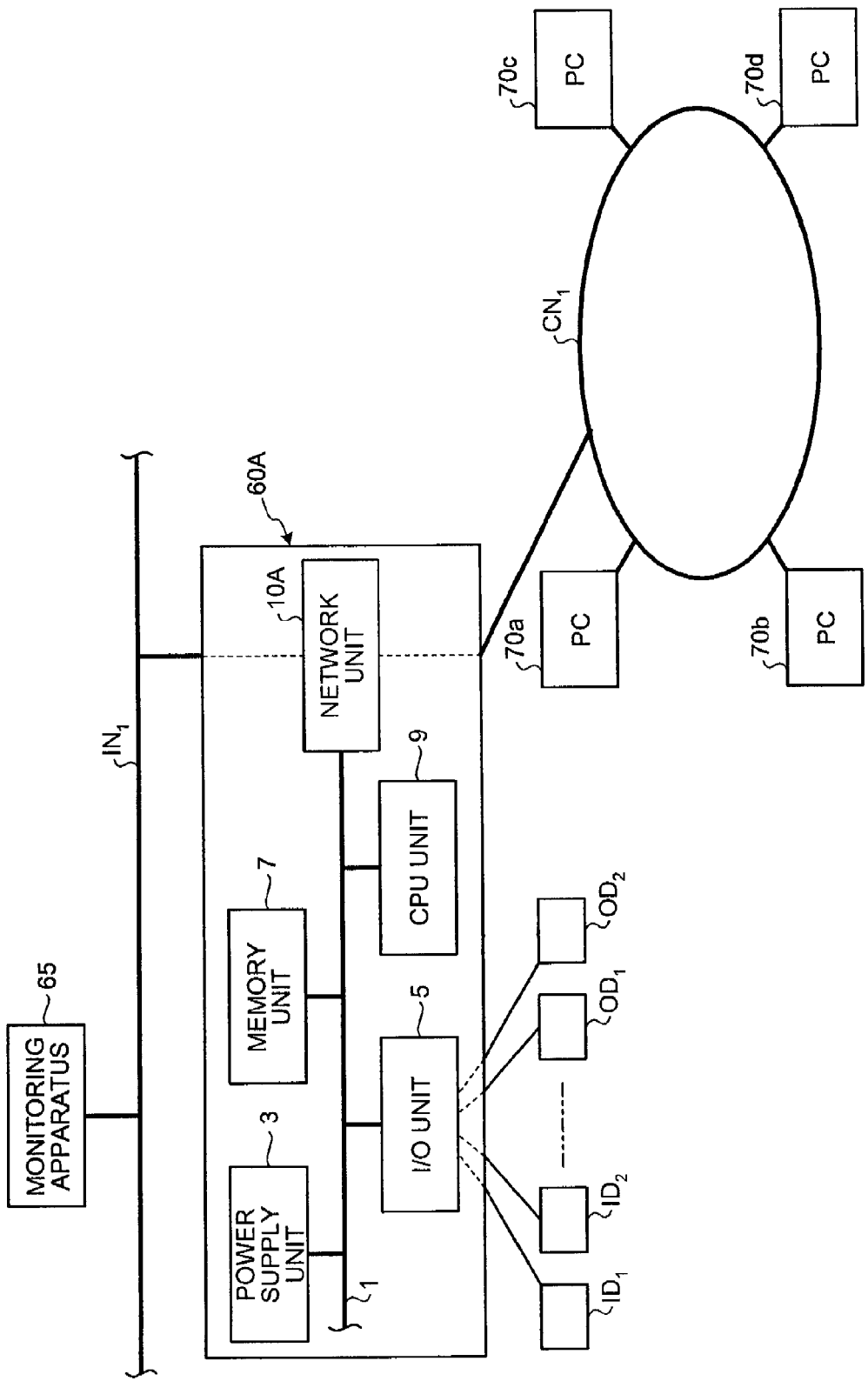
FIG. 1 is a schematic block diagram of an example of a programmable controller according to the present invention.

EXPLANATIONS OF LETTERS OR NUMERALS 1 system bus
5 I/O unit
9 CPU unit
10A, 10A$_2$, 10B, 10C, 10D, 10E network units
10a first sub-unit
10b second sub-unit
12 information-system interface unit
14 control-system interface unit
16 bus interface unit
20A, 20B information-system-transfer analyzing units
22A, 22B control-system-transfer analyzing units
24 information-system-data allocating unit
26 control-system-data allocating unit
28A, 28B, 28C control-system-conversion processing units
30A, 30B, 30C information-system-conversion processing unit
32A, 32B transmission arbitrating units
36A, 36B transmission-destination analyzing units
38A, 38B transmission-data allocating units
40 bus-usage-rate measuring unit
42 first received-data storing unit
44 second received-data storing unit
46 storage notifying unit
60A, 60B programmable controllers
65, 85 monitoring apparatuses
70a, 70b, 70c, 70d, 70g other programmable controllers
80a, 80b, 80c, 80d, 80g other programmable controllers
IN$_1$, IN$_2$ information system networks
CN$_1$, CN$_2$ control system networks
S$_i$ information-system allocation unit
S$_c$ control-system allocation unit
S$_t$ transmission allocating unit

BEST MODE(S) FOR CARRYING OUT THE INVENTION

Embodiments of a network unit and a programmable controller according to the present invention are explained in detail below with reference to the accompanying drawings. These inventions are not limited by the embodiments explained below.

First Embodiment

FIG. 1 is a schematic block diagram of an example of a programmable controller according to the present invention. A programmable controller 60A shown in the figure is a programmable controller of a building block type that monitors manufacturing facilities arranged on a manufacturing line and controls operations of the manufacturing facilities. The programmable controller 60A includes a system bus 1, a power supply unit 3, an I/O unit 5, a memory unit 7, a CPU unit 9, and a network unit 10A.

Predetermined input devices ID$_1$ and ID$_2$ and predetermined output devices OD$_1$ and OD$_2$ in a manufacturing facility as a control object are connected to the I/O unit 5. An information system network IN$_1$ and a control system network CN$_1$ are connected to the network unit 10A by wire or by radio. At least one node including a monitoring apparatus 65 is connected to the information system network IN$_1$. Other programmable controllers (PCs) 70a to 70d are connected to the control system network CN$_1$. No network other than the control system network CN$_1$ is connected to the information system network IN$_1$. No network other than the information system network IN$_1$ is connected to the control system network CN$_1$.

The power supply unit 3 that is included in the programmable controller 60A supplies electric power to the I/O unit 5, the memory unit 7, the CPU unit 9, and the network unit 10A through the system bus 1. When predetermined signals indicating operation states are input from the respective input devices ID$_1$ and ID$_2$ to the I/O unit 5, the I/O unit 5 transmits these signals to the CPU unit 9 through the system bus 1. When control signals for controlling operations of the respective output devices OD$_1$ and OD$_2$ are transmitted from the CPU unit 9 to the I/O unit 5 through the system bus 1, the I/O unit 5 outputs these control signals to the respective output devices OD$_1$ and OD$_2$.

Control data for controlling operations of the respective output devices OD$_1$ and OD$_2$ according to products manufactured in the manufacturing line and control data for controlling operations of respective output devices (not shown) connected to the other programmable controllers 70a to 70d, respectively, are stored in the memory unit 7. The CPU unit 9 generates the control signals based on the signals input to the I/O unit 5 from the respective input devices ID$_1$ and ID$_2$ and the control data stored in the memory unit 7. The CPU unit 9 transmits the control data stored in the memory unit 7 to the respective programmable controllers 70a to 70d according to the products manufactured in the manufacturing line.

The network unit 10A is a network unit according to the present invention and it mutually connects the information system network IN$_1$ and the control system network CN$_1$ and allocates a function of a gateway (hereinafter, "gateway relay function") to the programmable controller 60A. When signals or data are transmitted to the programmable controller 60A itself from the monitoring apparatus 65 or the other programmable controllers 70a to 70d, the network unit 10A outputs these signals or data to the CPU unit 9 through the system bus 1. Details of the network unit 10A are explained below referring to FIG. 2.

Figure 2:
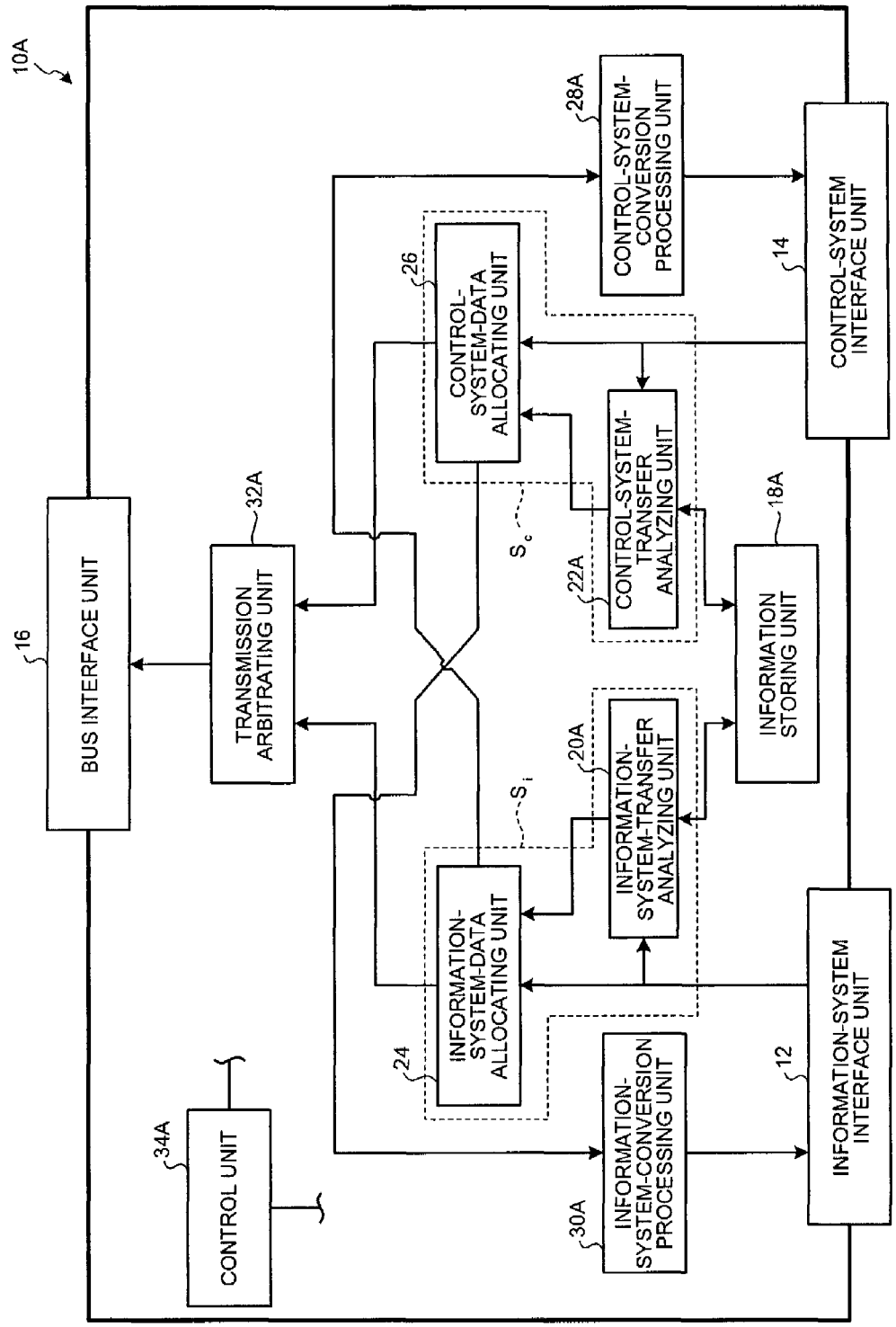
FIG. 2 is a schematic functional block diagram of an example of a network unit according to the present invention.

FIG. 2 is a schematic functional block diagram of an example of the network unit 10A. The network unit 10A shown in the figure includes an information-system interface unit 12 connected to the information system network IN$_1$ (see FIG. 1), a control-system interface unit 14 connected to the control system network CN$_1$ (see FIG. 1), and a bus interface unit 16 connected to the system bus. The network unit 10A further includes an information storing unit 18A, an information-system-transfer analyzing unit 20A, a control-system-transfer analyzing unit 22A, an information-system-data allocating unit 24, a control-system-data allocating unit 26, a control-system-conversion processing unit 28A, an information-system-conversion processing unit 30A, a transmission arbitrating unit 32A, and a control unit 34A.

Allocation information as a reference for allocating received data received by the information-system interface unit 12 or the control-system interface unit 14 to any one of the information-system interface unit 12, the control-system interface unit 14, and the bus interface unit 16 according to transmission destination information included in the received data is stored in the information storing unit 18A. In the received data received by the information-system interface unit 12 or the control-system interface unit 14, transmission destination information (e.g., a network address or a host address) for identifying a node or a programmable controller as a transmission destination of the received data is incorporated. Therefore, information can be used as the allocation information as long as the information is information, for example, like routing information, with which a correspondence relation among an apparatus (a node or a programmable controller) specified by the transmission destination information, a network to which the apparatus belongs, and connection destinations of the respective interface units 12, 14, and 16 can be judged.

Nodes or programmable controllers belonging to the respective networks $IN_1$ and $CN_1$ add the transmission destination information and the transmission source information for identifying the node or the programmable controller as the transmission source to a data body thereby generating transmission data and transmit the transmission data.

The information-system-transfer analyzing unit 20A is a part of an information-system allocation unit $S_i$ along with the information-system-data allocating unit 24, which is described in detail later. The information-system-transfer analyzing unit 20A judges, based on the transmission destination information included in the received data received by the information-system interface unit 12 and the allocation information stored in the information storing unit 18A, to which of the control-system interface unit 14 and the bus interface unit 16 the received data received by the information-system interface unit 12 should be allocated. In other words, the information-system-transfer analyzing unit 20A analyzes whether a transmission destination identified from the transmission destination information included in the received data received by the information-system interface unit 12 is the programmable controller 60A itself or the programmable controllers 70a to 70d belonging to the control system network $CN_1$ and judges to which of the control-system interface unit 14 and the bus interface unit 16 the received data should be allocated. A result of this judgment is reported to the information-system-data allocating unit 24.

The information-system-data allocating unit 24 is a part of the information-system allocation unit $S_i$ along with the information-system-transfer analyzing unit 20A. The information-system-data allocating unit 24 allocates the received data received by the information-system interface unit 12 to the control-system interface unit 14 side or the bus interface unit 16 side based on the judgment result of the information-system-transfer analyzing unit 20A. Specifically, the information-system-data allocating unit 24 allocates the received data whose transmission destination is any one of the programmable controllers 70a to 70d to the control-system interface unit 14, and allocates the received data whose transmission destination is the programmable controller 60A itself to the bus interface unit 16.

The control-system-transfer analyzing unit 22A is a part of a control-system allocation unit $S_c$ along with the control-system-data allocating unit 26, which is described in detail later. The control-system-transfer analyzing unit 22A judges, based on the transmission destination information included in the received data received by the control-system interface unit 14 and the allocation information stored in the information storing unit 18A, to which of the information-system interface unit 12 and the bus interface unit 16 the received data received by the control-system interface unit 14 should be allocated. In other words, the control-system-transfer analyzing unit 22A analyzes whether the transmission destination identified from the transmission destination information included in the received data received by the control-system interface unit 14 is the programmable controller 60A itself or a node (e.g., the monitoring apparatus 65) belonging to the information system network $IN_1$ and judges to which of the information-system interface unit 12 and the bus interface unit 16 the received data should be allocated. A result of the judgment is reported to the control-system-data allocating unit 26.

The control-system-data allocating unit 26 that is a part of the control-system allocation unit $S_c$ along with the control-system-transfer analyzing unit 22A allocates the received data received by the control-system interface unit 14 to the information-system interface unit 12 side or the bus interface unit 16 side based on the judgment result of the control-system-transfer analyzing unit 22A. Specifically, the control-system-data allocating unit 26 allocates the received data whose transmission destination is a node (e.g., the monitoring apparatus 65) belonging to the information system network $IN_1$ to the information-system interface unit 12 side, and allocates the received data whose transmission destination is the programmable controller 60A itself to the bus interface unit 16 side.

The control-system-conversion processing unit 28A converts the received data, which is allocated to the control-system interface unit 14 side by the information-system allocation unit $S_i$ (the information-system-data allocating unit 24), into data corresponding to a protocol in the control system network $CN_1$ and outputs the data to the control-system interface unit 14. On the other hand, the information-system-conversion processing unit 30A converts the received data, which is allocated to the information-system interface unit 12 side by the control-system allocation unit $S_c$ (the control-system-data allocating unit 26), into data corresponding to a protocol in the information system network $IN_1$ and outputs the data to the information-system interface unit 12.

The transmission arbitrating unit 32A outputs the respective received data, which are allocated to the bus interface unit 16 side by the information-system allocation unit $S_i$ (the information-system-data allocating unit 24) and the control-system allocation unit $S_c$ (the control-system-data allocating unit 26), i.e., the received data addressed to the programmable controller 60A, to the bus interface unit 16 while arbitrating the received data not to overlap each other. The transmission arbitrating unit 32A can be configured to directly output the received data to the bus interface unit 16 or can be configured to extract a data body from the received data and output only the data body to the bus interface unit 16. The control unit 34A controls operations of the entire network unit 10A.

In the programmable controller 60A (see FIG. 1) including the network unit 10A having such structure, the information system network $IN_1$ and the control system network $CN_1$ can be mutually connected by the network unit 10A without the intervention of the CPU unit 9. The mutual connection of the information system network $IN_1$ and the control system network $CN_1$ by the network unit 10A is specifically explained below by citing the reference numerals and signs used in FIG. 1 or 2 as appropriate.

For example, when data is transmitted from the monitoring apparatus 65 to the network unit 10A through the information system network $IN_1$, the data is received by the information-system interface unit 12 and, then, transmitted to the information-system allocation unit $S_i$ (the information-system-transfer analyzing unit 20A and the information-system-data allocating unit 24). The information-system-transfer analyzing unit 20A judges, based on transmission destination information included in the received data and the allocation information stored in the information storing unit 18A, to which of the control-system interface unit 14 and the bus interface unit 16 the received data should be allocated. The information-system-data allocating unit 24 allocates the received data to the control-system-conversion processing unit 28A or the transmission arbitrating unit 32A based on a result of the judgment of the information-system-transfer analyzing unit 20A.

The received data allocated to the control-system-conversion processing unit 28A, i.e., the received data transferred to the control system network $CN_1$ is converted into data corresponding to the protocol in the control system network $CN_1$ by the control-system-conversion processing unit 28A and output to the control-system interface unit 14. For example, when a transmission destination of the received data received by the information-system interface unit 12 is the programmable controller 70c, the received data is allocated to the control-system-conversion processing unit 28A by the information-system-data allocating unit 24, converted into data corresponding to the protocol in the control system network $CN_1$ by the control-system-conversion processing unit 28A, and, then, output to the control-system interface unit 14. The data output to the control-system interface unit 14 is received by the programmable controller 70c through the control system network CN1.

The received data allocated to the transmission arbitrating unit 32A by the information-system-data allocating unit 24, i.e., the received data addressed to the programmable controller 60A is output to the bus interface unit 16 from the transmission arbitrating unit 32A directly or after having a data body extracted therefrom. The data output to the bus interface unit 16 is transmitted to the CPU unit 9 through the system bus 1.

On the other hand, when data is transmitted from, for example, the programmable controller 70d to the network unit 10A through the control system network $CN_1$, the data is transmitted to the control-system allocation unit $S_c$ (the control-system-transfer analyzing unit 22A and the control-system-data allocating unit 26) after being received by the control-system interface unit 14. The control-system-transfer analyzing unit 22A judges, based on transmission destination information included in the received data and the allocation information stored in the information storing unit 18A, to which of the information-system interface unit 12 and the bus interface unit 16 the received data should be allocated. The control-system-data allocating unit 26 allocates the received data to the information-system-conversion processing unit 30A or the transmission arbitrating unit 32A based on a result of the judgment of the control-system-transfer analyzing unit 22A.

The received data allocated to the information-system-conversion processing unit 30A is converted into data corresponding to the protocol in the information system network $IN_1$ by the information-system-conversion processing unit 30A and output to the information-system interface unit 12. For example, when a transmission destination of the received data received by the control-system interface unit 14 is the monitoring apparatus 65, the received data is allocated to the information-system-conversion processing unit 30A by the control-system-data allocating unit 26, converted into data corresponding to the protocol in the information system network $IN_1$ by the information-system-conversion processing unit 30A, and, then, output to the information-system interface unit 12. The data output to the information-system interface unit 12 is received by the monitoring apparatus 65 through the information system network $IN_1$.

The received data allocated to the transmission arbitrating unit 32A, i.e., the received data addressed to the programmable controller 60A is output to the bus interface unit 16 from the transmission arbitrating unit 32A directly or after having a data body extracted therefrom. The data output to the bus interface unit 16 is transmitted to the CPU unit 9 through the system bus 1.

In this way, the network unit 10A mutually connects the information system network $IN_1$ and the control system network $CN_1$ without the intervention of the CPU unit 9 (see FIG. 1). Even when the network unit 10A mutually connects the information system network $IN_1$ and the control system network $CN_1$, the CPU unit 9 can timely perform processing of input signals from the respective input devises $ID_1$ and $ID_2$ and output of control signals to the respective output devices $OD_1$ and $OD_2$ (see FIG. 1) on a real time basis.

Therefore, in the programmable controller 60A including the network unit 10A, it is easy to apply predetermined sequence control to the manufacturing facilities corresponding thereto while mutually connecting the information system network $IN_1$ and the control system network $CN_1$. As a result, it is easy to increase sizes of the information system network $IN_1$ and the control system network $CN_1$ and realize an increase in size of the factory automation system. It is possible to allocate the gateway relay function to the programmable controller by mounting only the network unit 10A without mounting the two units, i.e., the information-system network unit and the control-system network unit unlike in the conventional technology. Therefore, aggregation of mounted throttles, reduction in the costs, and the like can be easily realized compared with the conventional technology.

In the first embodiment, the network units are configured as physically integral block unit. However, the network units according to the present invention can also be configured by using two or more sub-units that can be separated from one another. For example, a network unit having functions same as those of the network unit 10A can be configured with two sub-units that can be separated from each other. Those two sub-units can be a first sub-unit including a control-system-conversion processing unit and a second sub-unit including an information-system-conversion processing unit.

Figure 3:
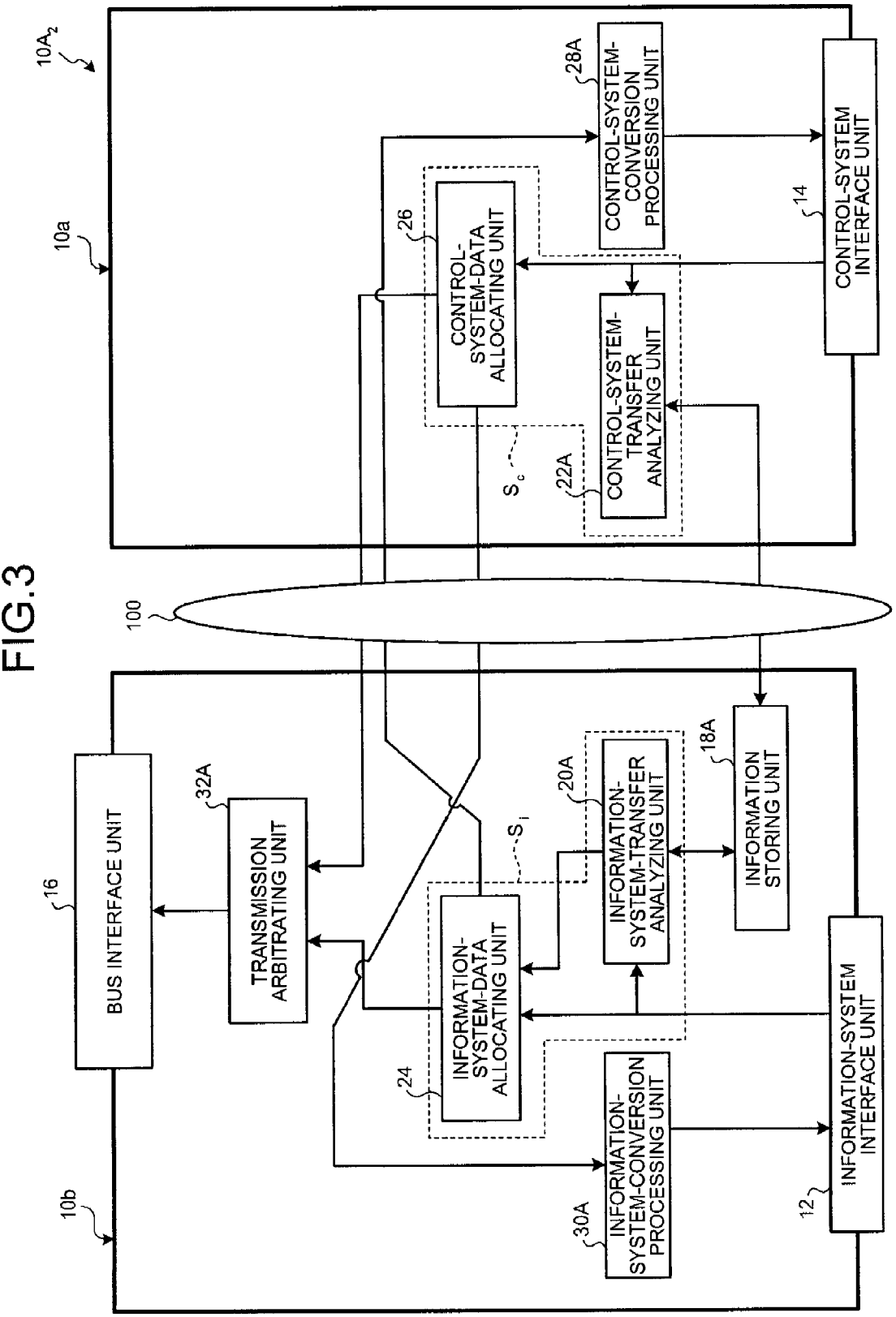
FIG. 3 is a schematic block diagram of an example of a network unit that has a first sub-unit including a control-system-conversion processing unit and a second sub-unit including an information-system-conversion processing unit among network units according to the present invention.

FIG. 3 is a schematic block diagram of an example of a network unit configured with a first sub-unit including the control-system-conversion processing unit and a second sub-unit including the information-system-conversion processing unit. A network unit $10A_2$ shown in the figure has functions same as those of the network unit 10A and includes a first sub-unit 10a, a second sub-unit 10b, and a connecting unit 100.

The control-system interface unit 14, the control-system allocation unit $S_c$ (the control-system-transfer analyzing unit 22A and the control-system-data allocating unit 26), and the control-system-conversion processing unit 28A are provided in the first sub-unit 10a. The information-system interface unit 12, the information-system allocation unit $S_i$ (the information-system-transfer analyzing unit 20A and the information-system-data allocating unit 24), the information-system-conversion processing unit 30A, the transmission arbitrating unit 32A, and the bus interface unit 16 are provided in the second sub-unit 10b. The connecting unit 100 includes, for example, a cable and a connector and it electrically connects the first sub-unit 10a and the second sub-unit 10b.

When the network unit includes a plurality of sub-units in this way, it is easy to allocate only functions necessary for a user to the programmable controller. Therefore, it is easily to realize reduction in the costs. For example, the first sub-unit 10a need not be provided when it is sufficient to connect the programmable controller to only the information system network $IN_1$ (see FIG. 1). This will lead to reduction in the costs. The first sub-unit 10a needs to be needs to be provided only when connection to the control system network $CN_1$ is necessary.

Second Embodiment

Figure 4:
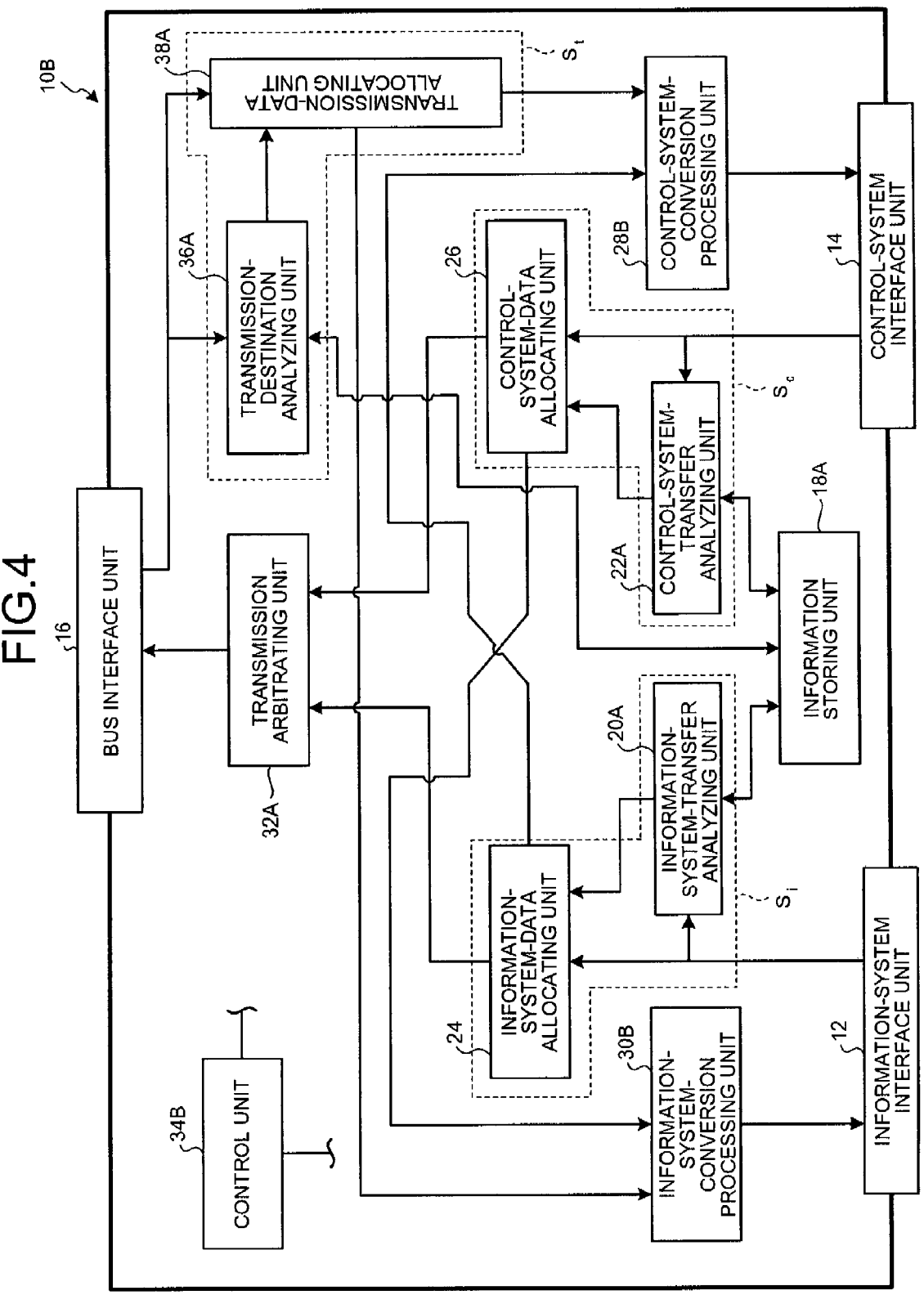
FIG. 4 is a schematic functional block diagram of another example of the network unit according to the present invention.

FIG. 4 is a schematic functional block diagram of another example of the network unit according to the present invention. A network unit 10B shown in the figure has a function of generating, when data is to be transmitted from a programmable controller including the network unit 10B, transmission data corresponding to a protocol in a network to which a transmission destination belongs. The network unit 10B has the structure in which a transmission-destination analyzing unit 36A and a transmission-data allocating unit 38A are further added to the network unit 10A shown in FIG. 2. A transmission allocating unit $S_t$ includes the transmission-destination analyzing unit 36A and the transmission-data allocating unit 38A.

The remaining structure, i.e., the structure excluding the transmission-destination analyzing unit 36A and the transmission-data allocating unit 38A, of the network unit 10B is the same as that of the network unit 10A shown in FIG. 2. However, because of the addition of the transmission-destination analyzing unit 36A and the transmission-data allocating unit 38A, new functions are added to the control-system-conversion processing unit, the information-system-conversion processing unit, and the control unit. In FIG. 4, the control-system-conversion processing unit is denoted by a reference sign "28B", the information-system-conversion processing unit is denoted by a reference sign "30B", and the control unit is denoted by a reference sign "34B". Among components shown in FIG. 4, components same as those shown in FIG. 2 are denoted by the same reference numerals and signs as those in FIG. 2 and explanation of those components is omitted.

When transmission data is transmitted from the system bus 1 (see FIG. 1) to the bus interface unit 16, the transmission-destination analyzing unit 36A judges, based on transmission destination information included in the transmission data and the allocation information stored in the information storing unit 18A, to which of the information-system interface unit 12 and the control-system interface unit 14 the transmission data should be allocated.

The transmission destination information in the transmission data is equivalent to the transmission destination information in the received data explained in the first embodiment. Therefore, the allocation information stored in the information storing unit 18A can be used as information for allocating the transmission data to one of the information-system interface unit 12 and the control-system interface unit 14 as well. A result of the judgment of the transmission-destination analyzing unit 36A is reported to the transmission-data allocating unit 38A. The CPU unit 9 (see FIG. 1) generates transmission data by adding the transmission destination information and the transmission source information for identifying a programmable controller to a data body and outputs the transmission data to the system bus 1 (see FIG. 1).

The transmission-data allocating unit 38A allocates the transmission data to the information-system interface unit 12 side or the control-system interface unit 14 side based on the analysis result of the transmission-destination analyzing unit 36A. Specifically, the transmission data whose transmission destination is a node belonging to the information system network $IN_1$ (see FIG. 1) is allocated to the information-system interface unit 12 side, and the transmission data whose transmission destination is a programmable controller belonging to the control system network $CN_1$ (see FIG. 1) is allocated to the control-system interface unit 14 side.

The control-system-conversion processing unit 28B has, besides functions same as those of the control-system-conversion processing unit 28A shown in FIG. 2, a function of converting the transmission data allocated to the control-system interface unit 14 side by the transmission allocating unit $S_t$ (the transmission-data allocating unit 38A) into data corresponding to the protocol in the control system network $CN_1$ and outputting the data to the control-system interface unit 14. For example, when the transmission data is data addressed to the programmable controller 70a (see FIG. 1), the transmission data is allocated to the control-system-conversion processing unit 28B by the transmission allocating unit (the transmission-data allocating unit 38A), converted into data corresponding to the protocol in the control system network $CN_1$ by the control-system-conversion processing unit 28B, and, then, output to the control-system interface unit 14. The transmission data output to the control-system interface unit 14 is received by the programmable controller 70a through the control system network $CN_1$.

The information-system-conversion processing unit 30B has, other than functions same as those of the information-system-conversion processing unit 30A shown in FIG. 2, a function of converting the transmission data allocated to the information-system interface unit 12 side by the transmission allocating unit $S_t$ (the transmission-data allocating unit 38A) into data corresponding to the protocol in the information system network $IN_1$ and outputting the data to the information-system interface unit 12. For example, when the transmission data is data addressed to the monitoring apparatus 65 (see FIG. 1), the transmission data is allocated to the information-system-conversion processing unit 30B by the transmission allocating unit $S_t$ (the transmission-data allocating unit 38A), converted into data corresponding to the protocol in the information system network $IN_1$ by the information-system-conversion processing unit 30B, and, then, output to the information-system interface unit 12. The transmission data output to the information-system interface unit 12 is received by the monitoring apparatus 65 through the information system network $IN_1$. The control unit 34B controls operations of the entire network unit 10B.

In the network unit 10B having such structure, the information system network $IN_1$ and the control system network $CN_1$ (see FIG. 1) can be mutually connected without the intervention of the CPU unit 9 (see FIG. 1). Besides, transmission of data to a node belonging to the information system network $IN_1$ and a programmable controller belonging to the control system network $CN_1$ can be performed.

The CPU unit 9 of the programmable controller including the network unit 10B only has to generate, without taking into account a protocol in a network to which a transmission destination belong, transmission data by adding transmission destination information and transmission source information to a data body desired to be transmitted. Therefore, loads applied to generation of the transmission data are reduced. Because the network unit 10B also serves as a unit for data transmission, a driver (a device driver) necessary for operations of the respective units included in the programmable controller can also be simplified. In this respect, loads applied to the CPU unit 9 also are reduced.

Therefore, in the programmable controller including the network unit 10B, it is easier to apply desired sequence control to the manufacturing facilities corresponding thereto while mutually connecting the information system network $IN_1$ and the control system network $CN_1$. As a result, it is easier to increase sizes of the information system network $IN_1$ and the control system network $CN_1$ and realize an increase in size of the factory automation system.

Third Embodiment

Figure 5:
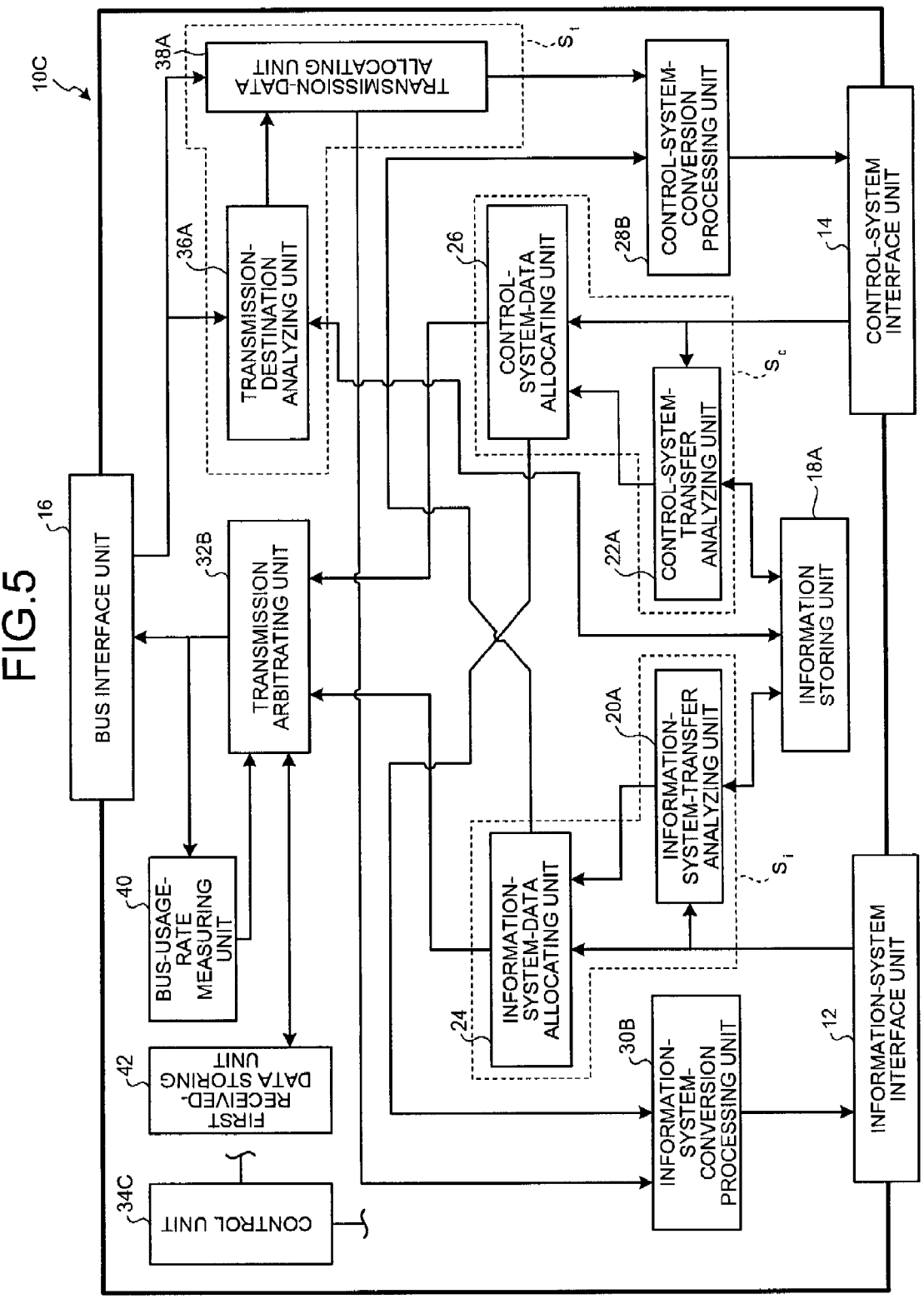
FIG. 5 is a schematic functional block diagram of still another example of the network unit according to the present invention.

FIG. 5 is a schematic functional block diagram of still another embodiment of the network unit according to the present invention. A network unit 10C shown in the figure has a function of controlling output of received data from the transmission arbitrating unit 32A to the bus interface unit 16 depending on a usage rate of the system bus 1 (see FIG. 1). The network unit 10C has the structure in which a bus-usage-rate measuring unit 40 and a first received-data storing unit 42 are further added to the network unit 10B shown in FIG. 4.

The remaining structure, i.e., the structure excluding the bus-usage-rate measuring unit 40 and the first received-data storing unit 42, of the network unit 10C is the same as that of the network unit 10B shown in FIG. 4. However, because of the addition of the bus-usage-rate measuring unit 40 and the first received-data storing unit 42, new functions are added to the transmission arbitrating unit and the control unit. In FIG. 5, the transmission arbitrating unit is denoted by reference sign "32B" and the control unit is denoted by reference sign "34C". Among components shown in FIG. 5, components same as those shown in FIG. 4 are denoted by reference numerals and signs same as those used in FIG. 4 and explanation of those components is omitted.

The bus-usage-rate measuring unit 40 calculates a usage rate of the system bus 1 (see FIG. 1) from transfer speed of received data output from the transmission arbitrating unit 32B to the bus interface unit 16, compares the usage rate and a condition value set in advance, and judges whether the output of the received data to the bus interface unit 16 should be continued or suspended. The bus-usage-rate measuring unit 40 also judges a resumption time for resuming the output after suspension of the output. Among results of these judgments, results of the judgments concerning suspension and resumption are reported to the transmission arbitrating unit 32B.

A relation between the transfer speed of the received data and the usage rate of the system bus 1 is obtained, for example, experimentally in advance. A condition for suspending the output of the received data from the transmission arbitrating unit 32B to the bus interface unit 16 is appropriately selected not to spoil a real time property and timeliness of transmission and reception of signals performed between the I/O unit 5 and the CPU unit 9 (see FIG. 1) when the programmable controller including the network unit 10C sequence-controls the manufacturing facilities. The resumption time after the suspension is judged according to, for example, whether time set in advance has elapsed from the suspension. Time from the suspension to the resumption is appropriately selected according to, for example, a period of transmission and reception of signals performed between the I/O unit 5 and the CPU unit 9 (see FIG. 1) when the programmable controller including the network unit 10C sequence-controls the manufacturing facilities.

The transmission arbitrating unit 32B outputs the remaining received data to the first received-data storing unit 42 when the output of the received data to the bus interface unit 16 is suspended based on the judgment result of the bus-usage-rate measuring unit 40. The transmission arbitrating unit 32B reads out the received data stored in the first received-data storing unit 42 and outputs the received data to the bus interface unit 16 when the output of the received data to the bus interface unit 16 is resumed. As described above, the first received-data storing unit 42 receives the supply of the received data from the transmission arbitrating unit 32B and temporarily stores the received data. The control unit 34C controls operations of the entire network unit 10C.

In the network unit 10C having such structure, the information system network $IN_1$ and the control system network $CN_1$ can be mutually connected without the intervention of the CPU unit 9 (see FIG. 1). On the other hand, the output of the received data from the transmission arbitrating unit 32B to the bus interface unit 16 can be controlled by the bus-usage-rate measuring unit 40 and the first received-data storing unit 42. Therefore, it is easy to surely guarantee a real time property and timeliness of transmission and reception of signals between the I/O unit 5 and the CPU unit 9 (see FIG. 1).

Therefore, in the programmable controller including the network unit 10C, it is easier to apply desired sequence control to the manufacturing facilities corresponding thereto while mutually connecting the information system network $IN_1$ and the control system network $CN_1$. As a result, it is easier to increase sizes of the information system network $IN_1$ and the control system network $CN_1$ and realize an increase in size of the factory automation system.

Fourth Embodiment

Figure 6:
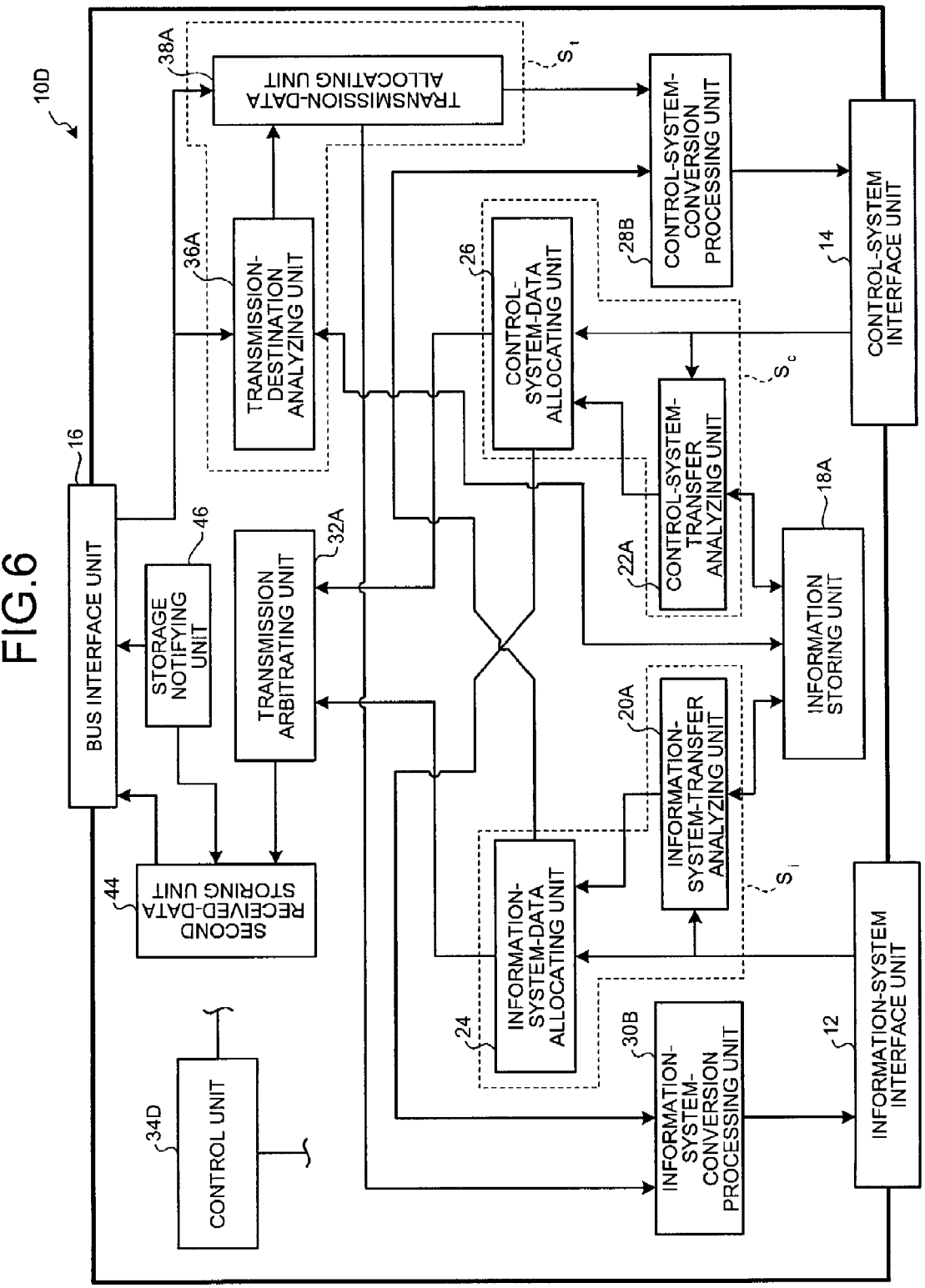
FIG. 6 is a schematic functional block diagram of still another example of the network unit according to the present invention.

FIG. 6 is a schematic functional block diagram of still another example of the network unit according to the present invention. In a network unit 10D shown in the figure, the CPU unit 9 (see FIG. 1) reads, at appropriate time, received data addressed to a programmable controller itself including the network unit 10D among received data received by the information-system interface unit 12 or the control-system interface unit 14. The network unit 10D has the structure in which a second received-data storing unit 44 and a storage notifying unit 46 are further added to the network unit 10B shown in FIG. 4.

The remaining structure, i.e., the structure excluding the second received-data storing unit 44 and the storage notifying unit 46, of the network unit 10D is the same as that of the network unit 10B shown in FIG. 4. However, because of the addition of the second received-data storing unit 44 and the storage notifying unit 46, new functions are added to the control unit. In FIG. 6, the control unit is denoted by a reference sign "34D". Among components shown in FIG. 6, components same as those shown in FIG. 4 are denoted by reference numerals and signs same as those in FIG. 4 and explanation of those components is omitted.

The second received-data storing unit 44 is connected to the transmission arbitrating unit 32A and the bus interface unit 16. Received data transmitted to the transmission arbitrating unit 32A is output from the transmission arbitrating unit 32A to the second received-data storing unit 44. The storage notifying unit 46 is connected to the second received-data storing unit 44 and the bus interface unit 16 and detects whether the received data is stored in the second received-data storing unit 44. When the received data is stored in the second received-data storing unit 44, the storage notifying unit 46 outputs a signal for notifying that the received data is stored in the second received-data storing unit 44 (hereinafter, "storage notifying signal") to the bus interface unit 16. The storage notifying signal is output to the bus interface unit 16 and, then, transmitted to the CPU unit 9 (see FIG. 1) through the system bus 1. The control unit 34D controls operations of the respective units of the network unit 10D.

For example, in the programmable controller described in above-mentioned Patent Document 1, areas for a reception queue and a transmission queue are secured in a random access memory (RAM), and the RAM and a communication unit are connected through the system bus. Therefore, the system bus has to be used to set a data link request (including data and a command) transmitted at arbitrary time in the RAM. As a result, it is likely that a real time property cannot be guaranteed when the program controller sequence-controls the manufacturing facilities.

On the other hand, in the programmable controller including the network unit 10D having the structure described above, the storage notifying unit 46 outputs the storage notifying signal to the bus interface unit 16. Therefore, the CPU unit 9 can access the second received-data storing unit 44 in the intervals between transmission and reception to and from the I/O unit 5 (see FIG. 1) and read out the received data stored in the second received-data storing unit 44. In other words, the received data received by the information-system interface unit 12 or the control-system interface unit 14 is not suddenly transmitted to the CPU unit 9. Therefore, it is easy to secure a real time property and timeliness in sequence-controlling the manufacturing facilities.

Therefore, in the programmable controller including the network unit 10D, it is easy to apply desired sequence control to the manufacturing facilities corresponding thereto while mutually connecting the information system network $IN_1$ and the control system network $CN_1$. As a result, it is easier to increase sizes of the information system network $IN_1$ and the control system network $CN_1$ and realize an increase in size of the factory automation system.

Fifth Embodiment

The programmable controller and the network unit according to the present invention are directly connected to the information system network $IN_1$ and the control system network $CN_1$ (see FIG. 1). In addition, the programmable controller and the network unit can be indirectly connected to other networks through the information system network $IN_1$ or the control system network $CN_1$. The number of networks to which the programmable controller and the network unit are connected is not specifically limited and can be set to a desired number equal to or larger than one. The networks directly connected to each other are mutually connected by an apparatus (e.g., a network unit) that has the gateway relay function.

Figure 7:
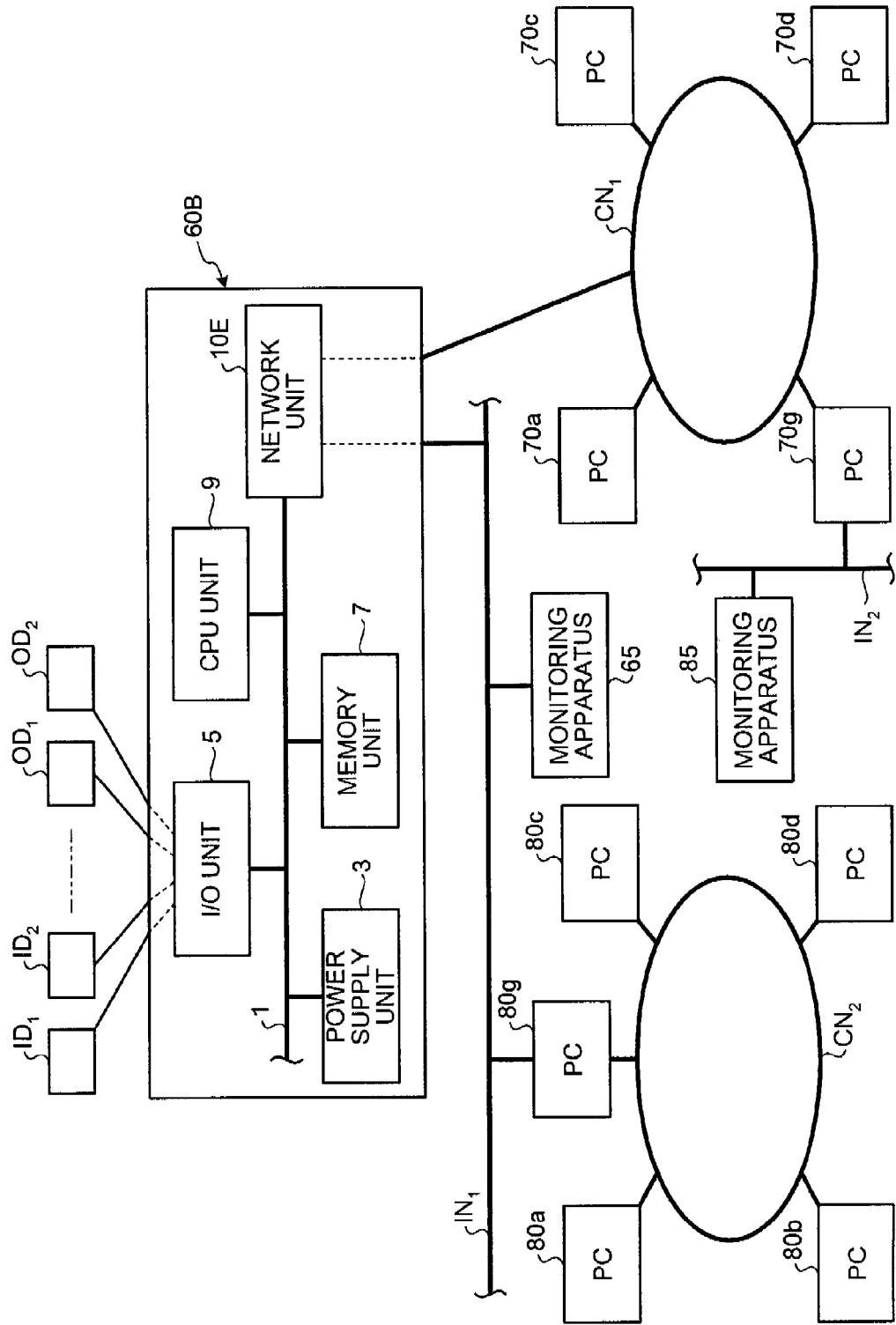
FIG. 7 is a schematic block diagram of another example of the programmable controller according to the present invention.

FIG. 7 is a schematic block diagram of an example of such a programmable controller. A programmable controller 60B shown in the figure is directly connected to the information system network $IN_1$ and the control system network $CN_1$. In addition, the programmable controller 60B is indirectly connected to another control system network $CN_2$ through the information system network $IN_1$, and also connected to another information system network $IN_2$ through the control system network $CN_1$. The programmable controller 60B includes a network unit 10E instead of the network unit 10A in the programmable controller 60A shown in FIG. 1. Among components shown in FIG. 7, components same as those shown in FIG. 1 are denoted by reference numerals and signs same as those in FIG. 1 and explanation of those components is omitted.

The information system network $IN_1$ and the control system network $CN_2$ shown in FIG. 7 are mutually connected by a programmable controller 80g having the gateway relay function. The control system network $CN_1$ and the information system network $IN_2$ are mutually connected via a programmable controller 70g having the gateway relay function. Besides the programmable controller 80g, four programmable controllers 80a to 80d are connected to the control system network $CN_2$. At least one node including a monitoring apparatus 85 is connected to the information system network $IN_2$. The programmable controller 80g has the gateway relay function for mutually connecting the information system network $IN_1$ and the control system network $CN_2$. The programmable controller 70g has the gateway relay function for mutually connecting the control system network $CN_1$ and the information system network $IN_2$. The node and the programmable controller having the gateway relay function are hereinafter referred to as "gateway relay destinations".

A node, or a programmable controller, belonging to any of those networks adds transmission source information and transmission destination information to the data body before outputting transmission data. Transmission destination information in transmission data that needs to be relayed includes last transmission destination information and gateway relay destination information. The last transmission destination information in information for identifying a node or a programmable controller as a last transmission destination and identifying a network to which the node or the programmable controller as the last transmission destination belongs. The gateway relay destination information is information for identifying a node or a programmable controller that is a gateway relay destination. The gateway relay destination information includes information for identifying a network to which the node or the programmable controller, which are the gateway relay destination, belongs.

Figure 8:
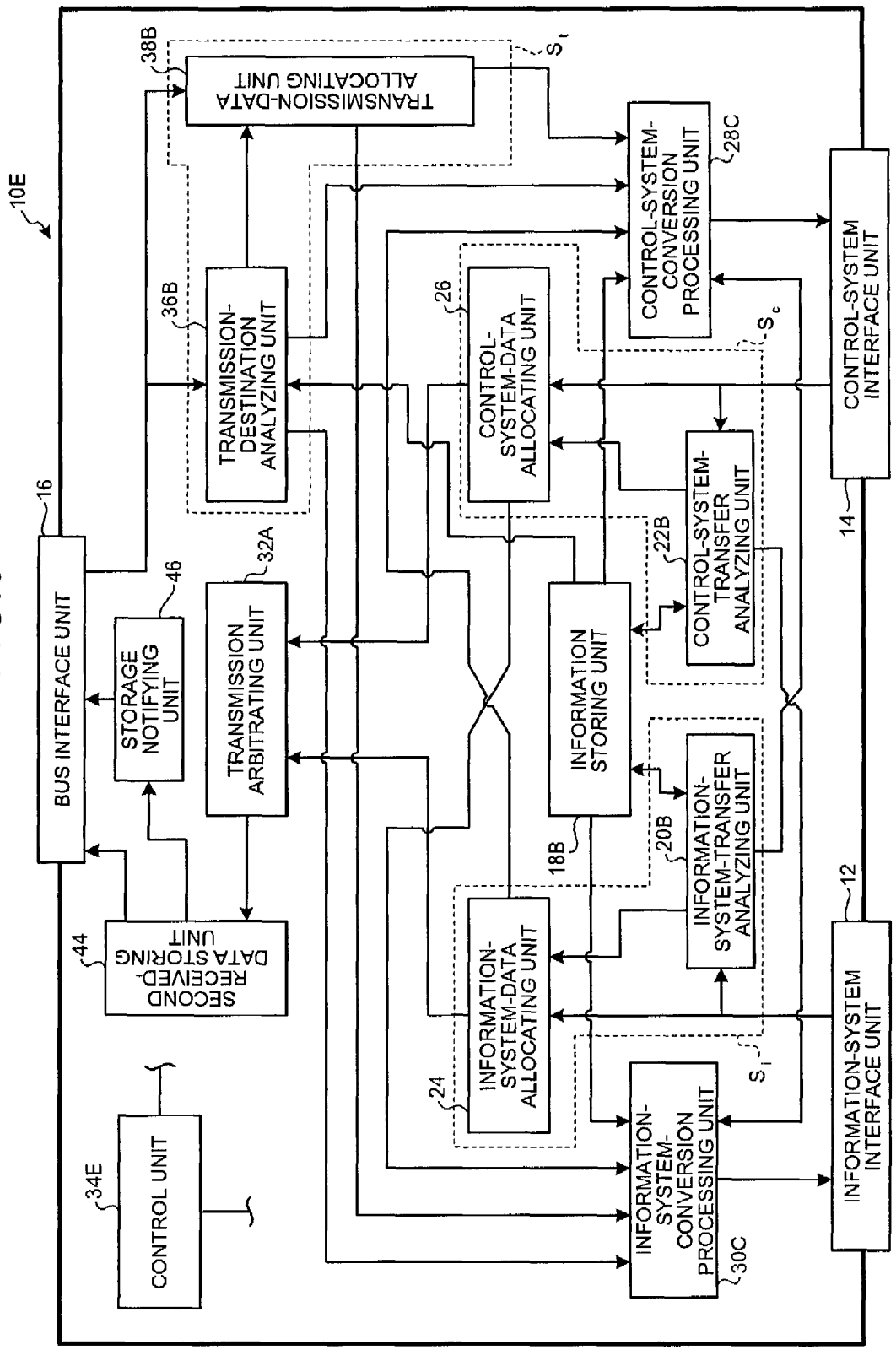
FIG. 8 is a schematic functional block diagram of still another example of the network unit according to the present invention.

FIG. 8 is a schematic functional block diagram of an example of the network unit 10E shown in FIG. 7. The network unit 10E shown in the figure includes an information storing unit 18B, an information-system-transfer analyzing unit 20B, a control-system-transfer analyzing unit 22B, a control-system-conversion processing unit 28C, an information-system-conversion processing unit 30C, a control unit 34E, a transmission-destination analyzing unit 36B, and a transmission-data allocating unit 38B instead of the information storing unit 18A, the information-system-transfer analyzing unit 20A, the control-system-transfer analyzing unit 22A, the control-system-conversion processing unit 28B, the information-system-conversion processing unit 30B, the control unit 34D, the transmission-destination analyzing unit 36A, and the transmission-data allocating unit 38A in the network unit 10D shown in FIG. 6. Other components in the network unit 10E are the same as those in the network unit 10D. Therefore, among components shown in FIG. 8, components same as those shown in FIG. 6 are denoted by reference numerals and signs same as those in FIG. 6 and explanation of the components is omitted.

In the information storing unit 18B, besides the allocation information, stored is relay destination selection information for selecting a node or a programmable controller set as a first gateway relay destination in transmitting received data received by the information-system interface unit 12 or the control-system interface unit 14 to another network (the information system network $IN_2$ or the control system network $CN_2$).

In the relay destination selection information, last transmission destination of received data and information for identifying a gateway relay destination that relays the received data first when the received data is transmitted to a last transmission destination are associated with each other to select a predetermined gateway relay destination according to the last transmission destination information in the received data. For example, if the control system networks $CN_1$ and $CN_2$ are networks that operate under UDP/IP (User Datagram Protocol/Internet Protocol), the relay destination selection information is manually input to the information storing unit 18B in advance. If the networks $IN_1$, $CN_1$, $IN_2$, and $CN_2$ are networks that operate under TCP/IP (Transmission Control Protocol/Internet Protocol), the relay destination selection information can be manually input in advance as described above, or the information storing unit 18B can be configured such that nodes or programmable controllers exchange route information with each other based on a routing protocol to automatically set the relay destination selection information.

For example, information associated such that, as a gateway relay destination of received data that is received by the information-system interface unit 12 and needs to be relayed, the programmable controller 70g belonging to the control system network $CN_1$ is selected and, as a gateway relay destination of received data that is received by the control-system interface unit 14 and needs to be relayed, the programmable controller 80g belonging to the information system network $IN_1$ is selected is set as the relay destination selection information.

The information-system-transfer analyzing unit 20B is a part of the information-system allocation unit $S_i$ along with the information-system-data allocating unit 24. The information-system-transfer analyzing unit 20B judges, based on the last transmission destination information included in the received data received by the information-system interface unit 12 and the allocation information and the relay destination selection information stored in the information storing unit 18B, to which of the control-system interface unit 14 and the bus interface unit 16 the received data received by the information-system interface unit 12 should be allocated. The information-system-transfer analyzing unit 20B analyzes necessity of relay of received data that should be allocated to the interface unit 14 and a first gateway relay destination at the time when the received data is relayed. The necessity of relay can be analyzed according to whether the two kinds of information, i.e., the gateway relay information and the last transmission destination information are included in the transmission destination information in the received data.

For example, when the last transmission destination of the received data received by the information-system interface unit 12 is the monitoring apparatus 85 (see FIG. 7), because the gateway relay destination information and the last transmission destination information are included in the received data, the information-system-transfer analyzing unit 20B analyzes that the received data is received data that needs to be relayed. The information-system-transfer analyzing unit 20B judges, based on the allocation information and the relay destination selection information stored in the information storing unit 18B, that the received data is received data that should be allocated to the control-system interface unit 14 side. The information-system-transfer analyzing unit 20B further analyzes, based on the last transmission destination information included in the received data and the relay destination selection information stored in the information storing unit 18B, that the first gateway relay destination is the programmable controller 70g.

The control-system-transfer analyzing unit 22B is a part of the control-system allocation unit $S_c$ along with the control-system-data allocating unit 26. The control-system-transfer analyzing unit 22B judges, based on the last transmission destination information included in the received data received by the control-system interface unit 14 and the allocation information and the relay destination selection information stored in the information storing unit 18B, to which of the information-system interface unit 12 and the bus interface unit 16 the received data received by the control-system interface unit 14 should be allocated. The control-system-transfer analyzing unit 22B analyzes necessity of relay of the received data that should be allocated to the information-system interface unit 12 and a first gateway relay destination at the time when the received data is relayed. The necessity of relay can be analyzed according to whether the two kinds of information, i.e., the gateway relay information and the last transmission destination information are included in the transmission destination information in the received data.

For example, when the last transmission destination of the received data received by the control-system interface unit 14 is the programmable controller 80c (see FIG. 7), because the gateway relay destination information and the last transmission destination information are included in the received data, the control-system-transfer analyzing unit 22B analyzes that the received data is received data that needs to be relayed. The control-system-transfer analyzing unit 22B judges, based on the allocation information and the relay destination selection information stored in the information storing unit 18B, the received data is received data that should be allocated to the information-system interface unit 12 side. The control-system-transfer analyzing unit 22B analyzes, based on the last transmission destination information included in the received data and the relay destination selection information stored in the information storing unit 18B, that a first gateway relay destination is the programmable controller 80g.

On the other hand, the transmission-destination analyzing unit 36B is a part of the transmission allocating unit $S_t$ along with the transmission-data allocating unit 38B. When transmission data is transmitted from the system bus 1 (see FIG. 7) to the bus interface unit 16, the transmission-destination analyzing unit 36B judges, based on transmission destination information included in the transmission data and the allocation information or the relay destination selection information stored in the information storing unit 18B, to which of the information-system interface unit 12 and the control-system interface unit 14 the transmission data should be allocated. The transmission-destination analyzing unit 36B analyses necessity of relay of the transmission data and a first gateway relay destination at the time when the transmission data is relayed. Even when transmission data that needs to be relayed is generated, the CPU unit 9 (see FIG. 7) generates the transmission data without adding gateway relay destination information to a data body. In other words, the CPU unit 9 generates transmission data including only last transmission destination information as transmission destination information.

The last transmission destination information in the transmission data is, as described above, information for identifying a node or a programmable controller as a last transmission destination and identifying a network to which the node or the programmable controller as the last transmission destination belongs. Therefore, the allocation information and the gateway allocation destination information stored in the information storing unit 18B can be used as information for judging to which of the information-system interface unit 12 and the control-system interface unit 14 the transmission data should be allocated or information for analyzing necessity of relay of the transmission data and a first gateway relay destination of the transmission data. Results of the judgment and the analysis of the transmission-destination analyzing unit 36B are reported to the transmission-data allocating unit 38B, the control-system-conversion processing unit 28C, and the information-system-conversion processing unit 30C.

The transmission-data allocating unit 38B allocates the transmission data to the information-system interface unit 12 side or the control-system interface unit 14 side based on the judgment and analysis results of the transmission-destination analyzing unit 36B. The transmission data whose last transmission destination or first gateway relay destination is a node belonging to the information system network $IN_1$ is allocated to the information-system interface unit 12 side. The transmission data whose last transmission destination or first gateway relay destination is a programmable controller belonging to the control system network $CN_1$ is allocated to the control-system interface unit 14 side.

The control-system-conversion processing unit 28C has functions same as those of the control-system-conversion processing unit 28B shown in FIG. 6. Besides, the control-system-conversion processing unit 28C has a function of, concerning the received data that needs to be relayed among the received data allocated to the control-system interface unit 14 side by the information-system allocation unit $S_i$ (the information-system-data allocating unit 24), changing gateway relay destination information of the received data to gateway relay destination information corresponding to last transmission destination information included in the received data based on the relay destination selection information stored in the information storing unit 18B. The control-system-conversion processing unit 28C further has a function of, concerning the transmission data that needs to be relayed among the transmission data allocated to the control-system interface unit 14 side by the transmission allocating unit $S_t$ (the transmission-data allocating unit 38B), obtaining gateway relay destination information corresponding to last transmission destination information included in the transmission data based on the relay destination selection information stored in the information storing unit 18B and adding the obtained gateway relay destination information to the transmission destination information of the transmission data. Each of the received data and the transmission data allocated to the control-system-conversion processing unit 28C is converted into data corresponding to the protocol of the control system network $CN_1$ regardless of the necessity of relay.

The information-system-conversion processing unit 30C has functions same as those of the information-system-conversion processing unit 30B shown in FIG. 6. Besides, the information-system-conversion processing unit 30C has a function of, concerning the received data that needs to be relayed among the received data allocated to the information-system interface unit 12 side by the control-system allocation unit $S_c$ (the control-system-data allocating unit 26), changing the gateway relay destination information of the received data to gateway relay destination information corresponding to the last transmission destination information included in the received data based on the relay destination selection information stored in the information storing unit 18B. The information-system-conversion processing unit 30c further has a function of, concerning transmission data that needs to be relayed among the transmission data allocated to the information-system interface unit 12 side by the transmission allocating unit $S_t$ (the transmission-data allocating unit 38B), obtaining gateway relay destination information corresponding to the last transmission destination information included in the transmission data based on the relay destination selection information stored in the information storing unit 18B and adding the obtained gateway relay destination information to the transmission destination information of the transmission data. Each of the received data and the transmission data allocated to the information-system-conversion processing unit 30C is converted into data corresponding to the protocol of the information system network $IN_1$ regardless of the necessity of relay.

Figure 9:
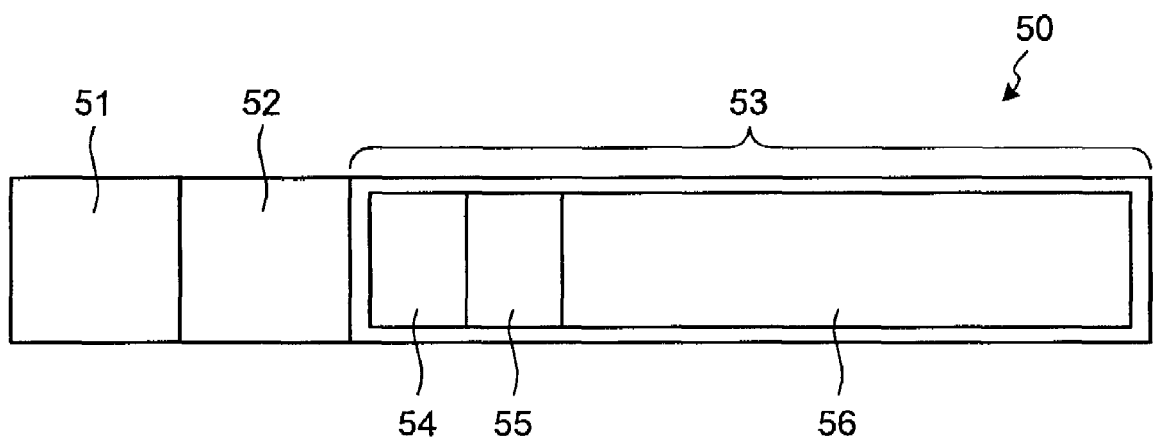
FIG. 9 is a conceptual diagram of an example of transmission data generated by encapsulation in a control-system-conversion processing unit or an information-system-conversion processing unit shown in FIG. 8.

When a protocol of the received data or the transmission data that needs to be relayed is converted by the control-system-conversion processing unit 28C or the information-system-conversion processing unit 30C, for example, a method such as encapsulation can be applied. FIG. 9 is a conceptual diagram of an example of transmission data (which needs to be relayed) generated by encapsulation in the control-system-conversion processing unit 28C or the information-system-conversion processing unit 30C. The transmission data 50 shown in the figure has the structure in which a first preamble section 51, a first header section 52, and a first payload section 53 continue in this order. In the first payload section 53, a second preamble section 54, a second header section 55, and a second payload section 56 continue in this order. Transmission source information and gateway relay destination information are incorporated in the first header section 52. Transmission source information and last transmission destination information are incorporated in the second header section 55. The second payload section 56 corresponds to a data body.

For example, the network unit 10E, or a device having functions equivalent to those of the network unit 10E, is included in each of nodes or programmable controllers that function as gateways among nodes or programmable controllers belonging to the respective networks $IN_1$, $CN_1$, $IN_2$, and $CN_2$. Consequently, it is possible to construct a system in which the respective networks $IN_1$, $CN_1$, $IN_2$, and $CN_2$ are mutually connected by the nodes or the programmable controllers having the gateway relay functions. In this case, a function that can incorporate, in generating transmission data that needs to be relayed, last transmission destination information in the transmission data and set a transmission destination of the transmission data as a gateway relay destination is allocated to the nodes or the programmable controllers belonging to each of those networks.

For example, when data is transmitted from the programmable controller 80a to the programmable controller 70d shown in FIG. 7, the programmable controller 80a generates transmission data whose transmission destination (gateway relay destination) is the programmable controller 80g. Incorporated in the transmission data are transmission source information for identifying the programmable controller 80a as a transmission source, last transmission destination information, i.e., information for identifying the programmable controller 70d as a last transmission source, and information for identifying the control system network $CN_1$ to which the programmable controller 70d belongs.

The transmission data is then transmitted from the programmable controller 80a to the programmable controller 80g through the control system network $CN_2$ and, then, converted into data corresponding to the protocol of the information system network $IN_1$ by the programmable controller 80g and converted into data whose transmission destination (gateway relay destination) is the programmable controller 60B, and output to the information system network $IN_1$. The data output to the information system network $IN_1$ is transmitted to the programmable controller 60B through the information system network $IN_1$ and received by the information-system interface unit 12 of the network unit 10E.

It is judged that the received data received by the information-system interface unit 12 of the programmable controller 60B is received data that should be allocated to the control-system interface unit 14 by the information-system allocation unit $S_i$ (the information-system-transfer analyzing unit 20B) because the final transmission destination is the programmable controller 70d. It is analyzed that the received data is data that does not need to be relayed. The received data is allocated to the control-system interface unit 14 side by the information-system allocation unit $S_i$ (the information-system-data allocating unit 24). Thereafter, the received data is converted into data corresponding to the protocol in the control system network $CN_1$ and having a transmission destination at the programmable controller 70d by the control-system-conversion processing unit 28C and output to the control-system interface unit 14. The data output to the control-system interface unit 14 is transmitted to the programmable controller 70d through the control system network $CN_1$ and received.

For example, when data is transmitted from the monitoring apparatus 85 to the programmable controller 80c shown in FIG. 7, the monitoring apparatus 85 generates transmission data whose transmission destination (gateway relay destination) is the programmable controller 70g. Incorporated in the transmission data are transmission source information for identifying the monitoring apparatus 85 as a transmission source, last transmission destination information, i.e., information for identifying the programmable controller 80c as a last transmission destination, and information for identifying the control system network $CN_2$ to which the programmable controller 80c belongs.

The transmission data is then transmitted from the monitoring apparatus 85 to the programmable controller 70g through the information system network $IN_2$ and, then, converted into data corresponding to the protocol in the control system network $CN_1$ by the programmable controller 70g and converted into data having a transmission destination (a gateway relay destination) at the programmable controller 60B, and output to the control system network $CN_1$. The data output to the control system network $CN_1$ is transmitted to the programmable controller 60B through the control system network $CN_1$ and received by the control-system interface unit 14 of the network unit 10E.

It is judged that the received data received by the control-system interface unit 14 of the programmable controller 60B is received data that should be allocated to the information-system interface unit 12 side by the control-system allocation unit $S_c$ (the control-system-transfer analyzing unit 22B) because the last transmission destination is the programmable controller 80c. It is analyzed that the received data is data that needs to be relayed. The received data is allocated to the information-system interface unit 12 side by the control-system allocation unit $S_c$ (the control-system-data allocating unit 26). Thereafter, the received data is converted into data corresponding to the protocol of the information system network $IN_1$ and having a transmission destination (a gateway relay destination) at the programmable controller 80a by the information-system-conversion processing unit 30C and output to the information-system interface unit 12.

The data output to the information-system interface unit 12 is received by the programmable controller 80g through the information system network $IN_1$, converted into data corresponding to the protocol in the control system network $CN_2$ by the programmable controller 80g and converted into data having a transmission destination at the programmable controller 80c, and output to the control system network $CN_2$. The data output to the control system network $CN_2$ is transmitted to the programmable controller 80c through the control system network $CN_2$ and received.

When the programmable controller 60B serves as a source and transmits data to, for example, the programmable controller 80d (see FIG. 7), the CPU unit 9 (see FIG. 7) adds, to a data body, transmission source information for identifying the programmable controller 60B as a transmission source, last transmission destination information, i.e., information for identifying the programmable controller 80d as a last transmission destination, and information for identifying the control system network $CN_2$ to which the programmable controller 80d belongs and generates transmission data.

The transmission data is transmitted to the bus interface unit 16 through the system bus 1 and, then, transmitted to the transmission-data allocating unit 38B. It is judged by the transmission-destination analyzing unit 36B to which of the information-system interface unit 12 and the control-system interface unit 14 the transmission data is allocated. Necessity of relay and a first gateway relay destination at the time when the transmission data is relayed are analyzed by the transmission-destination analyzing unit 36B. It is judged by the transmission-destination analyzing unit 36B that the transmission data is transmission data that should be allocated to the information-system interface unit 12; because, the last transmission destination is the programmable controller 80d. It is analyzed by the transmission-destination analyzing unit 36B that the transmission data needs to be relayed and the first gateway relay destination is the programmable controller 80g. The transmission data is allocated to the information-system interface unit 12 side by the transmission allocating unit $S_t$ (the transmission-data allocating unit 38B).

The transmission data allocated to the information-system interface unit 12 side is converted into data corresponding to the protocol in the information system network $IN_1$ and having a transmission destination (a gateway relay destination) at the programmable controller 80g by the information-system-conversion processing unit 30C. Last transmission destination information, i.e., information for identifying the programmable controller 80d as the last transmission destination and information for identifying the control system network $CN_2$ to which the programmable controller 80d belongs are incorporated in the data. The data is output to the information-system interface unit 12.

The data output to the information-system interface unit 12 is received by the programmable controller 80g through the information system network $IN_1$, converted into data corresponding to the protocol in the control system network $CN_2$ by the programmable controller 80g and converted into data having a transmission destination at the programmable controller 80d, and output to the control system network $CN_2$. The data output to the control system network $CN_2$ is transmitted to the programmable controller 80d through the control system network $CN_2$ and received.

In this way, in the programmable controller including the network unit 10E, the information system network $IN_1$, the control system network $CN_1$, and the other networks can be mutually connected. Moreover, because of a reason same as that in the programmable controller including the network unit 10D according to the fourth embodiment, even if the respective networks are mutually connected, desired sequence control can be easily applied to the manufacturing facilities corresponding thereto. As a result, it is easy to increase sizes of the information system network $IN_1$, the control system network $CN_1$, and the other networks, respectively, and it is easier to realize an increase in size of the factory automation system.

The network unit and the programmable controller according to the present invention have been explained referring to the five embodiments as examples. However, the present invention is not limited to the five embodiments described above. Various alterations, modifications, combinations, and the like of the embodiments are possible. For example, as in the network unit 10B shown in FIG. 4, it is also possible to remove the second received-data storing unit 44 and the storage notifying unit 46 shown in FIG. 8. It is also possible to provide the bus-usage-rate measuring unit 40 and the first received-data storing unit 42 shown in FIG. 5 instead of the second received-data storing unit 44 and the storage notifying unit 46 shown in FIG. 8.

The invention claimed is:

1. A network unit that is used as a block unit, in a first programmable controller as a gateway of a building block type, which monitors manufacturing facilities arranged on a manufacturing line and controls operations of the manufacturing facilities, and mutually connects an information system network for connecting at least one node including a monitoring apparatus and the first programmable controller and a control system network for connecting the first programmable controller and a plurality of second programmable controllers, the network unit comprising:
an information-system interface unit connected to the information system network;
a control-system interface unit connected to the control system network;
a bus interface unit connected to a system bus of the first programmable controller, wherein the system bus is connected to:
a power supply unit;
a memory unit;
an I/O unit that is connected to the manufacturing facilities; and
a CPU unit;
an information storing unit configured to store therein allocation information as a reference in allocating data received by the information-system interface unit or the control-system interface unit to any one of the information-system interface unit, the control-system interface unit, and the bus interface unit according to transmission destination information included in the received data;
an information-system allocation unit that allocates, based on the transmission destination information included in the data received by the information-system interface unit and the allocation information stored in the information storing unit, the data received by the information-system interface unit to one of a control-system-conversion processing unit and a transmission arbitrating unit, wherein the information-system allocation unit includes:
an information system-transfer analyzing unit configured to judge, based on the transmission destination information included in the received data and the allocation information stored in the information storing unit, to which of the control-system interface unit and the bus interface unit the received data should be allocated; and
an information-system-data allocating unit configured to allocate the received data to the control-system-conversion processing unit or the transmission arbitrating unit based on a result of the judgment of the information-system-transfer analyzing unit;
a control-system allocation unit that allocates, based on the transmission destination information included in data received by the control-system interface unit and the allocation information stored in the information storing unit, the data received by the control-system interface unit to one of an information-system-conversion processing unit and the transmission arbitrating unit, wherein the control-system allocation unit includes:
a control system-transfer analyzing unit configured to judge, based on the transmission destination information included in the received data and the allocation information stored in the information storing unit, to which of the information-system interface unit and the bus interface unit the received data should be allocated; and
a control-system-data allocating unit configured to allocate the received data to the information-system-conversion processing unit or the transmission arbitrating unit based on a result of the judgment of the control-system-transfer analyzing unit, wherein
the control-system-conversion processing unit is configured to convert the received data allocated to the control-system-conversion processing unit by the information-system allocation unit into data corresponding to a protocol in the control system network and outputs the data to the control-system interface unit, wherein
the information-system-conversion processing unit is configured to convert the received data allocated to the information-system-conversion processing unit by the control-system allocation unit into data corresponding to a protocol in the information system network and outputs the data to the information-system interface unit, wherein
the transmission arbitrating unit is configured to arbitrate the respective received data allocated to the transmission arbitrating unit by the information-system allocation unit and the control-system allocation unit, respectively, not to overlap each other,
wherein the network unit is provided in the first programmable controller.

2. The network unit according to claim 1, further comprising a transmission allocating unit that allocates, based on transmission destination information included in transmission data transmitted from the system bus to the bus interface unit and the allocation information stored in the information storing unit, the transmission data transmitted to the bus interface unit to one of the information-system interface unit and the control-system interface unit, wherein
the control-system-conversion processing unit converts the transmission data allocated to the control-system interface unit side by the transmission allocating unit into data corresponding to the protocol in the control system network and outputs the data to the control-system interface unit, and
the information-system-conversion processing unit converts the transmission data allocated to the information-system interface unit side by the transmission allocating unit into data corresponding to the protocol in the information system network and outputs the data to the information-system interface unit.

3. The network unit according to claim 1, further comprising:
a bus-usage-rate measuring unit that calculates a usage rate of the system bus from transfer speed of the received data output from the transmission arbitrating unit to the bus interface unit, compares the usage rate and a condition value set in advance to judge whether the output of the received data to the bus interface unit should be continued or suspended, and judges resumption time after the suspension; and
a first received-data storing unit that temporarily stores therein the received data output from the transmission arbitrating unit, wherein the transmission arbitrating unit outputs, when the output of the received data to the bus interface unit is suspended based on a result of the judgment made by the bus-usage-rate measuring unit, the remaining received data to the first received-data storing unit and reads out, when the output of the received data to the bus interface unit is resumed, the received data stored in the first received-data storing unit and outputs the received data to the bus interface unit.

4. The network unit according to claim 1, further comprising:
a second received-data storing unit connected to the transmission arbitrating unit and the bus interface unit; and
a storage notifying unit that outputs, when the received data is stored in the second received-data storing unit, a storage notifying signal for notifying the storage of the received data to the bus interface unit, wherein
the transmission arbitrating unit outputs the received data to the second received-data storing unit.

5. The network unit according to claim 1, wherein
the network unit is used in a system in which another network including one or more nodes or programmable controllers is further connected to at least one of the information system network and the control system network via an apparatus having a gateway relay function and last transmission destination information and gateway relay destination information are included as transmission destination information in transmission data that needs to be relayed by a gateway,
relay destination selection information for selecting gateway relay destination information corresponding to the last transmission destination information is further stored in the information storing unit,
the control-system-conversion processing unit converts, based on the relay destination selection information stored in the information storing unit, gateway relay destination information of received data that needs to be relayed into gateway relay destination information corresponding to a last transmission destination of the received data and outputs the received data to the control-system interface unit, and
the information-system-conversion processing unit converts, based on the relay destination selection information stored in the information storing unit, the gateway relay destination information of the received data that needs to be relayed into the gateway relay destination information corresponding to the last transmission destination of the received data and outputs the received data to the information-system interface unit.

6. The network unit according to claim 1, wherein
the network unit is used in a system in which another network including one or more nodes or programmable controllers is further connected to, via an apparatus having a gateway relay function, at least one of the information system network connected to the information-system interface unit and the control system network connected to the control-system interface unit and last transmission destination information and gateway relay destination information are included as transmission destination information in transmission data that needs to be relayed by a gateway,
relay destination selection information for selecting gateway relay destination information corresponding to the last transmission destination information is further stored in the information storing unit,
only the last transmission destination information is included as transmission destination information in transmission data transmitted from the system bus to the bus interface unit,
the control-system-conversion processing unit converts, concerning received data that needs to be relayed, based on the relay destination selection information stored in the information storing unit, gateway relay destination information of the received data into gateway relay destination information corresponding to last transmission destination information included in the received data and outputs the received data to the control-system interface unit, and obtains, concerning transmission data that needs to be relayed, based on the relay destination selection information stored in the information storing unit, gateway relay destination information corresponding to last transmission destination information included in the transmission data, adds the obtained gateway relay destination information to transmission destination information of the transmission data, and outputs the transmission data to the control-system interface unit, and
the information-system-conversion processing unit converts, concerning received data that needs to be relayed, based on the relay destination selection information stored in the information storing unit, gateway relay destination information of the received data into gateway relay destination information corresponding to last transmission destination information included in the received data and outputs the received data to the information-system interface unit, and obtains, concerning transmission data that needs to be relayed, based on the relay destination selection information stored in the information storing unit, gateway relay destination information corresponding to last transmission destination information included in the transmission data, adds the obtained gateway relay destination information to transmission destination information of the transmission data, and outputs the transmission data to the information-system interface unit.

7. The network unit according to claim 1, further comprising:
a first sub-unit including the control-system-conversion processing unit; and
a second sub-unit including the information-system-conversion processing unit.

8. A programmable controller of a building block type comprising:
a system bus;
a central processing unit connected to the system bus, an I/O unit connected to the system bus and connected to an input and output device of a manufacturing facility; and
a network unit connected to an information system network and a control system network, the programmable controller monitoring manufacturing facilities arranged on a manufacturing line to control operations of the manufacturing facilities and mutually connecting the information system network and the control system network, wherein
the network unit comprises:
an information-system interface unit connected to the information system network;
a control-system interface unit connected to the control system network;
a bus interface unit connected to the system bus of the programmable controller;
an information storing unit configured to store therein allocation information as a reference in allocating data received by the information-system interface unit or the control-system interface unit to any one of the information-system interface unit, the control-system interface unit, and the bus interface unit according to transmission destination information included in the received data;
an information-system allocation unit that allocates, based on the transmission destination information included in the data received by the information-system interface unit and the allocation information stored in the information storing unit, the data received by the information-system interface unit to one of a control-system-conversion processing unit and a transmission arbitrating unit, wherein the information-system allocation unit includes:
- an information system-transfer analyzing unit configured to judge, based on the transmission destination information included in the received data and the allocation information stored in the information storing unit, to which of the control-system interface unit and the bus interface unit the received data should be allocated; and
- an information-system-data allocating unit configured to allocate the received data to the control-system-conversion processing unit or the transmission arbitrating unit based on a result of the judgment of the information-system-transfer analyzing unit;

a control-system allocation unit that allocates, based on the transmission destination information included in data received by the control-system interface unit and the allocation information stored in the information storing unit, the data received by the control-system interface unit to one of an information-system-conversion processing unit and the transmission arbitrating unit, wherein the control-system allocation unit includes:
- a control system-transfer analyzing unit configured to judge, based on the transmission destination information included in the received data and the allocation information stored in the information storing unit, to which of the information-system interface unit and the bus interface unit the received data should be allocated; and
- a control-system-data allocating unit configured to allocate the received data to the information-system-conversion processing unit or the transmission arbitrating unit based on a result of the judgment of the control-system-transfer analyzing unit, wherein the control-system-conversion processing unit is configured to convert the received data allocated to the control-system-conversion processing unit by the information-system allocation unit into data corresponding to a protocol in the control system network and outputs the data to the control-system interface unit, wherein the information-system-conversion processing unit is configured to convert the received data allocated to the information-system-conversion processing unit by the control-system allocation unit into data corresponding to a protocol in the information system network and outputs the data to the information-system interface unit, wherein the transmission arbitrating unit is configured to arbitrate the respective received data allocated to the transmission arbitrating unit by the information-system allocation unit and the control-system allocation unit, respectively, not to overlap each other.

* * * * *